US010953351B2

(12) United States Patent
Iwata et al.

(10) Patent No.: US 10,953,351 B2
(45) Date of Patent: Mar. 23, 2021

(54) CONTINUOUS BUBBLE REMOVAL METHOD AND CONTINUOUS BUBBLE REMOVAL APPARATUS

(71) Applicants: NAGOYA INSTITUTE OF TECHNOLOGY, Nagoya (JP); SINTOKOGIO, LTD., Nagoya (JP)

(72) Inventors: Shuichi Iwata, Nagoya (JP); Katsuaki Odagi, Toyokawa (JP); Yoshihisa Suzuki, Toyokawa (JP)

(73) Assignees: NAGOYA INSTITUTE OF TECHNOLOGY, Nagoya (JP); SINTOKOGIO, LTD., Nagoya (JP)

( * ) Notice: Subject to any disclaimer, the term of this patent is extended or adjusted under 35 U.S.C. 154(b) by 196 days.

(21) Appl. No.: 16/098,828

(22) PCT Filed: Apr. 27, 2017

(86) PCT No.: PCT/JP2017/016835
§ 371 (c)(1),
(2) Date: Nov. 2, 2018

(87) PCT Pub. No.: WO2017/195644
PCT Pub. Date: Nov. 16, 2017

(65) Prior Publication Data
US 2019/0224590 A1    Jul. 25, 2019

(30) Foreign Application Priority Data
May 12, 2016    (JP) .............................. JP2016-096299

(51) Int. Cl.
*B01D 19/00*    (2006.01)
(52) U.S. Cl.
CPC ......... *B01D 19/0073* (2013.01); *B01D 19/00* (2013.01)

(58) Field of Classification Search
CPC .......................... B01D 19/00; B01D 19/0073
See application file for complete search history.

(56) References Cited

U.S. PATENT DOCUMENTS

| 2,206,507 A | * | 7/1940 | Kuhni | .................... B01D 19/02 96/176 |
| 5,432,969 A | | 7/1995 | Oh | |

(Continued)

FOREIGN PATENT DOCUMENTS

| CN | 1102676 A | 5/1995 |
| CN | 1668848 A | 9/2005 |

(Continued)

OTHER PUBLICATIONS

Jun. 27, 2017 Search Report issued in International Patent Application No. PCT/JP2017/016835.

(Continued)

*Primary Examiner* — Jonathan Miller
*Assistant Examiner* — Gabriel E Gitman
(74) *Attorney, Agent, or Firm* — Oliff PLC

(57) ABSTRACT

A continuous bubble removal method includes: preparing a main container, a basic pressurization container that connects to the main container and holds a basic operating liquid, and a basic movable portion that is displaceably attached to the basic pressurization container; flowing target liquid through the main container, the liquid including a bubble; and iteratively decreasing and increasing a volume of the bubble by iteratively pressurizing and depressurizing the target liquid from a region via the basic operating liquid by displacing, in a reciprocating manner, the basic movable portion, the region being surrounded by a basic connecting portion of the basic pressurization container that is closer to the main container than the basic supporting portion, wherein an opening area of the basic supporting portion is larger than an opening area of the basic connecting portion.

9 Claims, 16 Drawing Sheets

(56) References Cited

U.S. PATENT DOCUMENTS

| | | | | |
|---|---|---|---|---|
| 2006/0051232 A1* | 3/2006 | Ooi | ............... | F04B 35/00 |
| | | | | 418/229 |
| 2011/0247490 A1* | 10/2011 | Mueller | ............... | F04B 13/00 |
| | | | | 95/26 |
| 2012/0137889 A1 | 6/2012 | Iwata et al. | | |
| 2014/0202331 A1* | 7/2014 | Iwata | ............... | B01D 19/0073 |
| | | | | 95/247 |
| 2014/0271252 A1* | 9/2014 | Vines | ............... | F04B 43/06 |
| | | | | 417/53 |

FOREIGN PATENT DOCUMENTS

| | | |
|---|---|---|
| JP | S52-49877 A | 4/1977 |
| JP | H06-315590 A | 11/1994 |
| JP | H07-83862 B2 | 9/1995 |
| JP | 2004-298856 A | 10/2004 |
| WO | 2004022972 A1 | 3/2004 |
| WO | 2011/018972 A1 | 2/2011 |
| WO | 2013/021849 A1 | 2/2013 |

OTHER PUBLICATIONS

Jun. 27, 2017 Written Opinion issued in International Patent Application No. PCT/JP2017/016835.

* cited by examiner

CONTINUOUS BUBBLE REMOVAL METHOD AND CONTINUOUS BUBBLE REMOVAL APPARATUS

TECHNICAL FIELD

The present invention relates to a continuous bubble removal method for removing bubbles in liquid, and a continuous bubble removal apparatus that removes bubbles in liquid.

BACKGROUND ART

The removal of bubbles in a highly viscous fluid is not easy due to the viscosity, and various bubble removal methods have been proposed. For example, with the bubble removal technology described in PTL 1, liquid flows into a container through an inlet, and as the volume of the container changes, pressurization and depressurization in the container are iteratively performed. Consequently, the volume of bubbles in the liquid iteratively decreases and increases, and as a result, shearing occurs in the liquid around the bubbles. This shearing causes the viscosity of the liquid around the bubbles to decrease, such that the rate at which the bubbles rise due to buoyancy increases. The bubbles that have risen are guided to a bubble outlet of the container, and the liquid from which the bubbles have been removed flows out of the container through a liquid outlet. In this way, bubbles are continuously removed from the liquid.

Also, with the bubble removal technology described in PTL 2, pressurization and depressurization in a container are performed from a plurality of locations in the container. As a result, the rate at which bubbles rise naturally increases compared to the technology described in PTL 1, thus improving the removal efficiency of bubbles.

CITATION LIST

Patent Literature

[PTL 1]
International Publication No. WO 2011-018972
[PTL 2]
International Publication No. WO 2013-021849
[PTL 3]
Japanese Patent No. 2054897

SUMMARY OF INVENTION

Technical Problem

With technology such as that described in PTL 1 and PTL 2, one method for further increasing the removal rate of bubbles in liquid is an improvement method that increases the amount of change in the pressurization and depressurization exerted from one location in the container.

However, examination by the inventor of the present application revealed that in order to realize such an improvement method, the stiffness of the mechanism for pressurization and depressurization must be significantly increased. As a result, there is a problem that the device for removing bubbles becomes larger.

In light of the foregoing, it is an object of the present invention to improve the rate at which bubbles are removed, while suppressing an increase in size of the device for removing bubbles.

Solution to Problem

A continuous bubble removal method designed to achieve the above-described object includes: preparing a main container, a basic pressurization container that connects to the main container and holds a basic operating liquid, and a basic movable portion that is displaceably attached to the basic pressurization container; flowing target liquid through the main container, the target liquid being a target of degassing, the liquid including a bubble; and iteratively decreasing and increasing a volume of the bubble by iteratively pressurizing and depressurizing the target liquid from a region via the basic operating liquid by displacing, in a reciprocating manner, the basic movable portion while supporting the basic movable portion by a basic supporting portion of the basic pressurization container, the region being surrounded by a basic connecting portion of the basic pressurization container that is closer to the main container than the basic supporting portion. An opening area of the basic supporting portion is larger than an opening area of the basic connecting portion.

Also, a continuous bubble removal apparatus designed to achieve the above-described object includes a main container through which target liquid flows, the target liquid being a target of degassing, the liquid including a bubble; a basic pressurization container that connects to the main container and holds a basic operating liquid, and a basic movable portion that is displaceably attached to the basic pressurization container. The basic pressurization container includes a basic supporting portion that supports the basic movable portion when the basic movable portion is displaced in a reciprocating manner with respect to the basic pressurization container, and a basic connecting portion that is closer to the main container than the basic supporting portion and connects to the main container. The basic movable portion iteratively applies force to the basic operating liquid held in the basic pressurization container, by being displaced in a reciprocating manner with respect to the basic pressurization container while being is supported by the basic supporting portion. The basic operating liquid iteratively pressurizes and depressurizes the target liquid, from a region surrounded by the basic connecting portion, by iteratively receiving force as the basic movable portion is displaced in a reciprocating manner. A volume of the bubble included in the target liquid iteratively decreases and increases by the target liquid being iteratively pressurized and depressurized by the basic operating liquid. An opening area of the basic supporting portion is larger than an opening area of the basic connecting portion.

As described above, the opening area of the basic supporting portion that supports the basic movable portion is larger than the opening area of the basic connecting portion that is a path along which force corresponding to the reciprocating displacement of the basic movable portion is transmitted to the target liquid. Therefore, the pressure that is applied to the target liquid from the basic connecting portion is able to be increased, compared to when the basic pressurization container is not provided, while suppressing the displacement amplitude of the movable portion. As a result, the rate at which bubbles are removed is able to be increased, while inhibiting an increase in size of the device for removing bubbles.

Also, according to another aspect, a continuous bubble removal apparatus includes a main container through which target liquid flows, the target liquid being target of degassing, the target liquid including a bubble, a basic movable portion, and a basic cam that rotates and thereby urges the
} basic movable portion to displace the basic movable portion by rotating. The basic movable portion iteratively pressurizes and depressurizes the target liquid in the main container by being urged and displaced in a reciprocating manner by the basic cam. A volume of the bubble in the target liquid iteratively decreases and increases as a result of the target liquid being iteratively pressurized and depressurized. A method using a cam in this way is able to transmit stronger pressure oscillation to the bubble than before, so the degassing effect also improves.

DESCRIPTION OF EMBODIMENTS

First Embodiment

Figure 1:
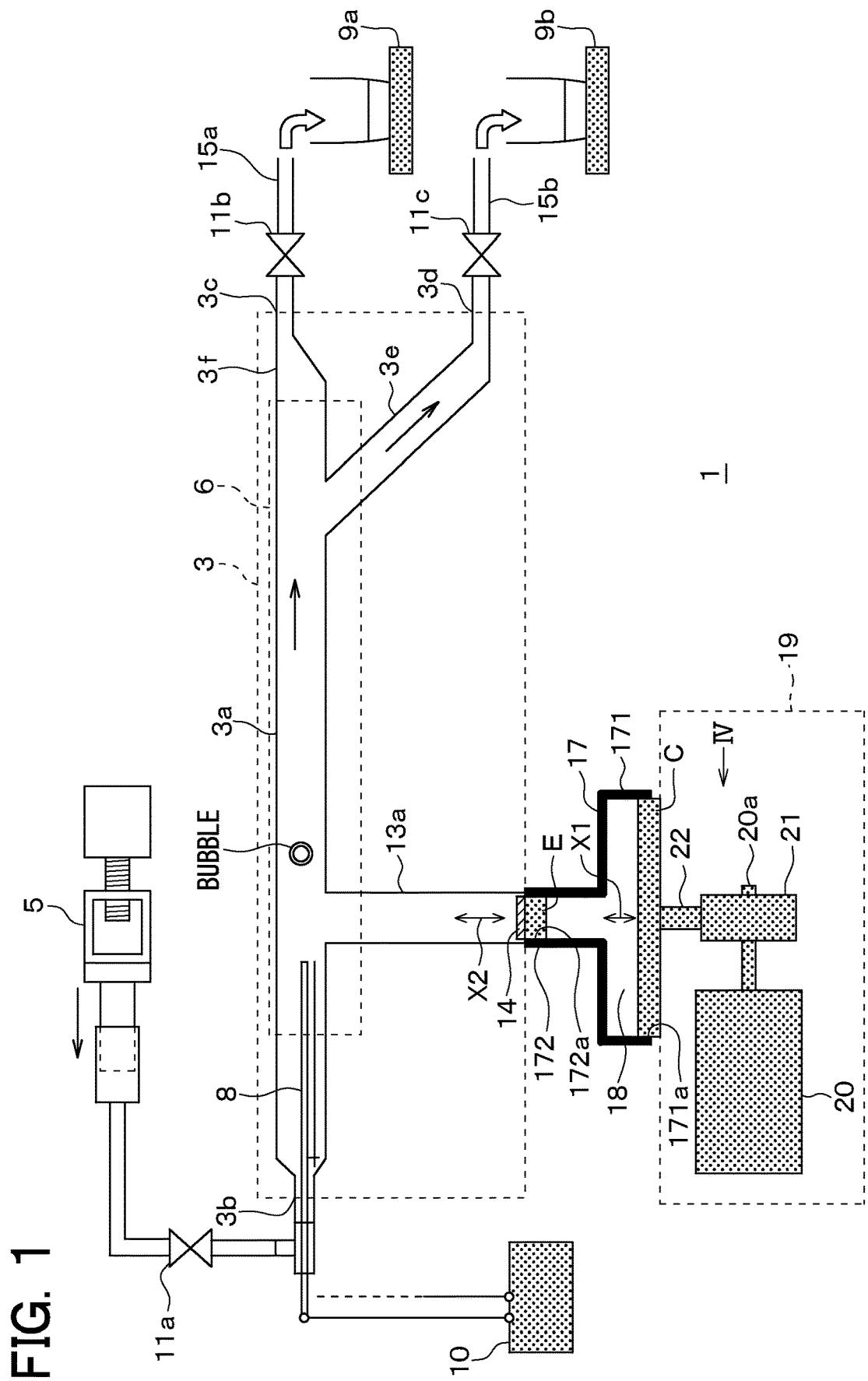
FIG. 1 is a view showing a frame format of the overall configuration of a continuous bubble removal apparatus according to a first embodiment.

Hereinafter, a first embodiment will be described. As shown in FIG. 1, a continuous bubble removal apparatus 1 of the present embodiment includes a main container 3, a high-pressure micro feeder 5, electronic balances 9a and 9b, variable throttle valves 11a, 11b, and 11c, a pressurization container 17, and a drive mechanism 19, and the like.

One liquid inlet 3b and two outlets 3c and 3d are formed in the main container 3. The outlet 3c is an outlet out through which bubbles and target liquid being target of degassing flow. Hereinafter, the outlet 3c will be referred to as the bubble outlet. The outlet 3d is an outlet out through which the target liquid whose bubbles have been removed flows. Hereinafter, the outlet 3d will be referred to as the liquid outlet.

Also, the main container 3 is provided with a main flow path 3a for delivering the target liquid from the liquid inlet 3b to the bubble outlet 3c and the liquid outlet 3d, and a branch flow path 13a that branches off from the main flow path 3a while being communicated with the main flow path 3a and extends downward. When the continuous bubble removal apparatus 1 is operating, the main flow path 3a and the branch flow path 13a hold the target liquid that includes bubbles and are filled with the target liquid.

A sight glass 6 is attached to the main flow path 3a such that the path of the bubbles in the main flow path 3a can be confirmed visually or the like through the sight glass 6. Also, an electrode 8 for generating bubbles is inserted into the main flow path 3a through the liquid inlet 3b. The electrode 8 is connected to a constant voltage generator 10. Note that the sight glass 6, the electrode 8, and the constant voltage generator 10 are used to verify the bubble separation effect and are not essential to the continuous bubble removal apparatus 1. In ordinary use of the continuous bubble removal apparatus 1, the target liquid that enters the main flow path 3a through the liquid inlet already contains bubbles.

The liquid inlet 3b is provided at one end portion of the main flow path 3a. The liquid inlet 3b is connected to the high-pressure micro feeder 5 via the variable throttle valve 11a. The high-pressure micro feeder 5 corresponds to a pressure-feed portion.

The bubble outlet 3c is provided at the other end portion of the main flow path 3a. The bubble outlet 3c is connected to a recovery pipe 15a via the variable throttle valve 11b. The recovery pipe 15a is a pipe for leading fluid that flows out from the variable throttle valve 11b to a beaker for weighing that is placed on the electronic balance 9a.

Also, the main flow path 3a branches into a lower passage 3e and an upper passage 3f at a location downstream of the liquid inlet 3b and upstream of the bubble outlet 3c and the liquid outlet 3d. The lower passage 3e branches downward from the upper passage 3f.

The downstream end of the lower passage 3e becomes the liquid outlet 3d, and the downstream end of the upper passage 3f becomes the bubble outlet 3c. The liquid outlet 3d is connected to a recovery pipe 15b via the variable throttle valve 11c. The recovery pipe 15b is a pipe for leading fluid that flows out from the variable throttle valve 11c to a beaker for weighing that is placed on the electronic balance 9b.

The branch flow path 13a branches downward from farther upstream than the branch point where the main flow path 3a branches into the lower passage 3e and the upper passage 3f. The direction in which the branch flow path 13a branches off from the main flow path 3a and extends is downward in order to reduce the possibility of bubbles entering the target liquid that fills this branch flow path 13a.

An elastic membrane 14 formed by an elastic body is attached to the lower end of the branch flow path 13a. An outer edge portion of the elastic membrane 14 is fixed to the lower end of the branch flow path 13a, and the upper surface of the elastic membrane 14 contacts the target liquid. The portion other than the outer edge portion of the elastic membrane 14 is able to be displaced with respect to the branch flow path 13a. This elastic membrane 14 seals the lower end of the branch flow path 13a in liquid-tight manner, so the target liquid in the main container 3 will not leak out from the lower end of the branch flow path 13a.

Further, the pressurization container 17 is connected to the lower end of the branch flow path 13a. The pressurization container 17 has a large diameter section 171 and a small diameter section 172. The large diameter section 171 and the small diameter section 172 are connected together, with the small diameter section 172 being closer to the branch flow path 13a than the large diameter section 171. The opening area of the large diameter section 171 is sufficiently larger than the opening area of the small diameter section 172.

The connection between the pressurization container 17 and the lower end of the branch flow path 13a is realized by connecting an open end portion 172a on the upper side (i.e., the branch flow path 13a side) of the small diameter section 172 to the lower end of the branch flow path 13a. The open end portion 172a is closed off by a piston E made of resin or the like.

The piston E is supported by an inside wall of the open end portion 172a. The piston E seals the open end portion 172a in a liquid-tight manner but is able to slide with respect to the inside wall of the open end portion 172a. Therefore, the piston E is able to be displaced in a reciprocating manner along an axial direction X2 of the small diameter section 172, while being supported by the inside wall of the open end portion 172a.

Also, the piston E and the elastic membrane 14 are displaced in a reciprocating manner in the axial direction X2 in a state in which an upper end surface of the piston E and a lower end surface of the elastic membrane 14 are in contact with each other. Further, the area of the upper end surface of the piston E and the area of the lower end surface of the elastic membrane 14 are substantially the same.

In this way, the branch flow path 13a and the small diameter section 172 are not communicated together, as the elastic membrane 14 and the piston E separate the branch flow path 13a from the pressurization container 17. However, operating liquid 18 in the pressurization container 17 is able to urge the target liquid in the branch flow path 13a via the piston E and the elastic membrane 14. The piston E and the elastic membrane 14 correspond to a separating body.

A piston C is fitted to an inside wall of an open end portion 171a on the lower end side of the large diameter section 171. The piston C closes off the open end portion 171a in a liquid-tight manner but is able to be displaced forward and backward along an axial direction X1 (i.e., the vertical direction) of the large diameter section 171, while being supported by the inside wall of the open end portion 171a.

Also, the opening area of the open end portion 171a on the lower end side of the large diameter section 171 is sufficiently larger than the opening area of the open end portion 172a on the upper end side of the small diameter section 172.

Both openings of the pressurization container 17 are sealed in a liquid-tight manner by the piston C and the piston E as described above, and the inside of the pressurization container 17 is filled with the operating liquid 18. The operating liquid 18 may be any liquid having a low viscosity, a high vapor pressure, and a high boiling point. More specifically, the operating liquid 18 may be cutting oil for a machine tool, salad oil, silicon oil, or water.

The drive mechanism 19 for displacing the piston C up and down is arranged below the piston C. Upward displacement of the piston C corresponds to forward displacement, and downward displacement corresponds to backward displacement. The pressurization container 17 and the drive mechanism 19 form an excitation converter.

Figure 2:
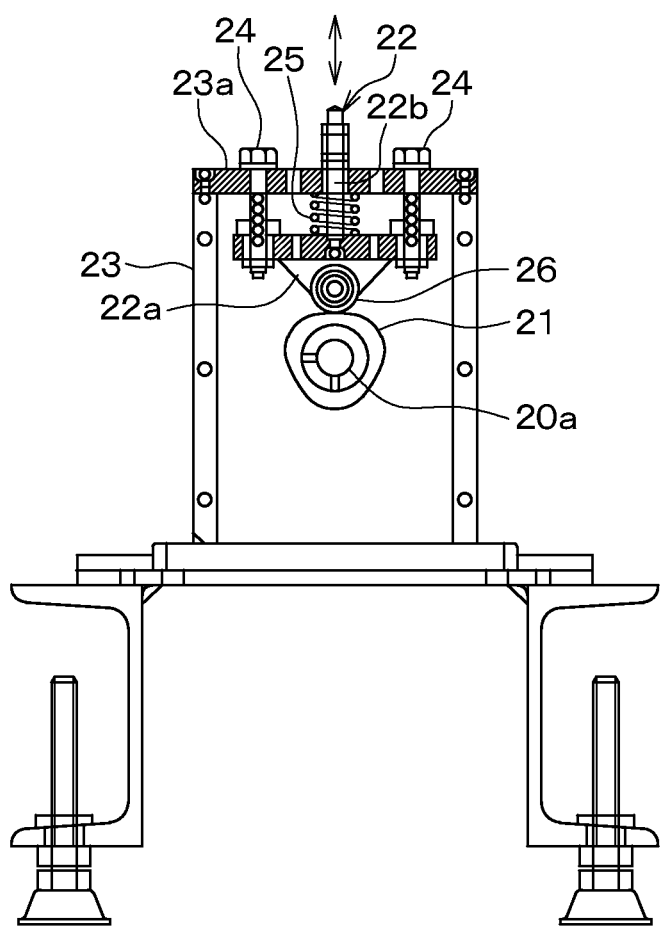
FIG. 2 is an explanatory view of the specific structure related to an oscillator.

The drive mechanism 19 is formed by a motor 20 that serves as the drive source, a cam 21 that is attached to an output shaft 20a of the motor 20, and an oscillator 22 that is driven up and down by the cam 21, and the like. The specific structure relating to the oscillator 22 is as shown in FIG. 2. The oscillator 22 has a lower base portion 22a and a push rod 22b.

The push rod 22b is a rod-shaped member that extends in the vertical direction and passes through a hole provided in an upper surface 23a of a support frame 23 such that an upper portion of the push rod 22b is protruding. An upper end portion of the push rod 22b is arranged so as to be able to contact the piston C. The upper end portion of the push rod 22b may be constantly connected to the piston C. Alternatively, the upper end portion of the push rod 22b may come into contact with the piston C when the oscillator 22 is displaced upward and separate from the piston C when the oscillator 22 is displaced downward.

A lower end portion of the push rod 22b is fixed to the lower base portion 22a. The lower base portion 22a is slidably connected to a guide 24 that extends downward from an upper surface of the support frame 23. The oscillator 22 reciprocates freely up and down while being guided by the guide 24, and the up and down trajectory of the oscillator 22 follows the extending direction of the guide 24.

Also, a helical compression coil spring 25 is interposed between the lower base portion 22a of the oscillator 22 and the upper surface 23a. The helical compression coil spring 25 surrounds the push rod 22b between the lower base portion 22a and the upper surface 23a. Therefore, the oscillator 22 is urged downward by the helical compression coil spring 25.

A cam follower 26 is attached, so as to be rotatable with respect to the lower base portion 22a, to the lower side of the lower base portion 22a of the oscillator 22. More specifically, the cam follower 26 has a roller and a rotating shaft. This rotating shaft is attached so as to be rotatable and slidable with respect to the lower base portion 22a. The extending direction of the rotating shaft is orthogonal to the vertical direction, and parallel to the output shaft 20a.

Also, a disc-shaped roller is fixed, orthogonal to the rotating shaft, to one end of this rotating shaft. The rotating shaft and the roller rotate together as a single unit. The outer periphery of the roller abuts against the outer circumferential surface (i.e., the cam surface) of the cam 21. This abutment is maintained by the urging force of the helical compression coil spring 25.

As a result of this kind of configuration, when the cam 21 is rotatably driven by the motor 20 and the cam follower 26 is pushed up by a nose of the cam 21, the oscillator 22 is displaced upward, and when the cam follower 26 follows the valley of the cam 21 by the urging force of the helical compression coil spring 25, the oscillator 22 is displaced downward. At this time, the strength of the force with which the oscillator 22 is urged in directions other than the vertical direction by the cam 21 is able to be reduced by the entire cam follower 26 being dragged by the rotation of the cam and rotating.

Also, as described above, when the oscillator 22 is displaced upward, the upper end portion of the push rod 22b pushes the piston C up, thereby raising the piston C. Also, when the push rod 22b is connected to the piston C and the oscillator 22 is displaced downward, the upper end portion of the push rod 22b pulls the piston C back down, thereby lowering the piston C. Also, when the push rod 22b is not connected to the piston C and the oscillator 22 is displaced downward, the upper end portion of the push rod 22b separates from the piston C, and the piston C is displaced downward by its own weight and the pressure received from the operating liquid 18.

Note that the piston C follows the push rod 22b with higher responsiveness both when the push rod 22b rises and falls in a case where the push rod 22b is always connected to the piston C as compared with a case where the push rod 22b is not always connected to the piston C. Therefore, the behavior of the piston C is able to be controlled more finely when the push rod 22b is always connected to the piston C than when the push rod 22b is not always connected to the piston C. For example, it also becomes easier to change the amount of displacement of the piston C over time in a triangular wave rather than changing the amount of displacement of the piston C over time in a sine curve, by controlling the rotation of the cam 21.

Figure 3:
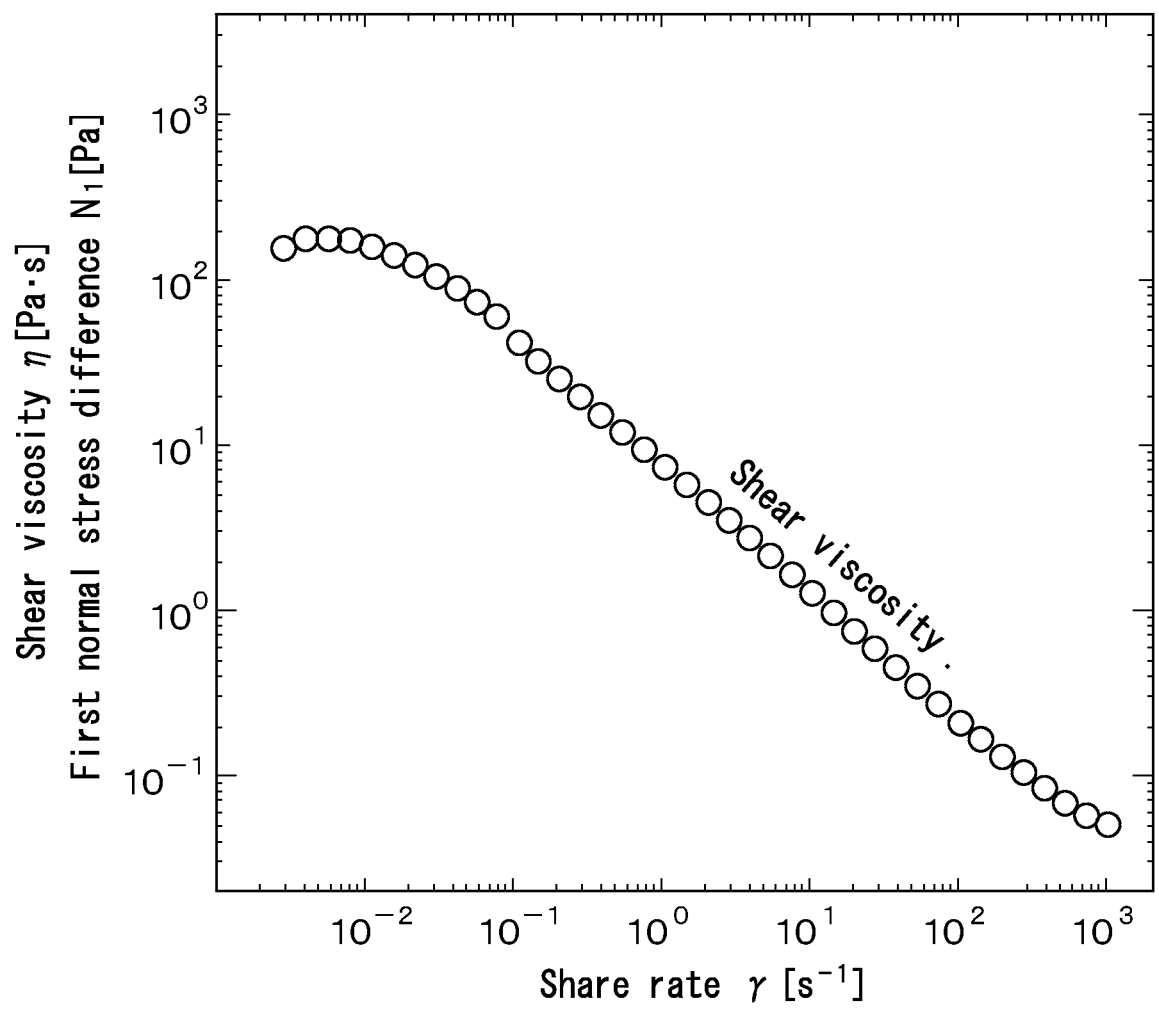
FIG. 3 is a view of rheological properties of liquid.

Next, a verification example of bubble removal by the continuous bubble removal apparatus 1 of the present example will be described. First, the sample liquid (a highly viscous fluid) used in this example is a 0.800 wt % sodium polyacrylate aqueous solution. The viscosity curve of this sample solution is as shown in FIG. 3. As is evident from FIG. 3, this sample liquid (0.800 wt % sodium polyacrylate aqueous solution) exhibits a viscosity of 253 Pa·s when the shear rate is extremely low and has a property (shear thinning property) in which the viscosity (shear viscosity) decreases as the shear rate increases. Therefore, this sample liquid is liquid in which the viscosity decreases when shearing occurs.

This sample liquid is pressure-fed into the main flow path 3a from the liquid inlet 3b of the main container 3 by the high-pressure micro feeder 5. In this example, the feed pressure of the high-pressure micro feeder 5 is approximately 0.4 to 5 atmospheres. The sample liquid delivered into the main flow path 3a from the liquid inlet 3b of the main container 3 flows toward the bubble outlet 3c and the liquid outlet 3d while filling the inside of the main flow path 3a (including the branch flow path 13a and the lower passage 3e).

At this time, the valve opening amounts of the variable throttle valves 11a, 11b, and 11c are reduced. This is done to increase the flow resistance of the variable throttle valves 11a, 11b, and 11c so that the variable throttle valves 11a, 11b, and 11c function as resistance portions. The flow ratio of the bubble outlet 3c side to the liquid outlet 3d side is able to be set by adjusting the valve opening amounts of the variable throttle valves 11b and 11c.

Also, the valve opening amounts of the variable throttle valves 11a, 11b, and 11c are made extremely small, so the flow resistance of the variable throttle valves 11a, 11b, and 11c becomes extremely large. Therefore, the sample liquid in the main flow path 3a can be depressurized and pressurized. The high-pressure micro feeder 5 pressure-feeds the liquid against the flow resistance of the variable throttle valves 11a, 11b, and 11c.

With the sample liquid continuously flowing inside the main flow path 3a from the liquid inlet 3b to the outlets 3c and 3d, current is supplied to the constant voltage generator 10 for a predetermined period of time, and bubbles are generated from the electrode 8. As a result, the sample liquid becomes target liquid being target of degassing, the target liquid including bubbles. Also, the drive mechanism 19 is continuously operated.

Therefore, the motor 20 continuously rotates the cam 21. As a result, the oscillator 22 that was urged by the cam 21 via the cam follower 26 is iteratively displaced up and down (i.e., displaced in a reciprocating manner). The piston C is iteratively displaced up and down by this iterative displacement of the oscillator 22.

At this time, the piston C iteratively applies force to the operating liquid 18 held in the pressurization container 17, by being displaced up and down with respect to the pressurization container 17 while being supported by the open end portion 171a. Also, the operating liquid 18 causes the piston E to be displaced up and down with respect to the pressurization container 17, in a region surrounded by the open end portion 172a, by iteratively receiving force as the piston C is displaced in a reciprocating manner.

The up and down displacement of the piston C acts on the operating liquid 18, as displacement that pushes the operating liquid 18 out through the open end portion 172a of the small diameter section 172 toward the branch flow path 13a and draws the operating liquid 18 back in, that is, as iterative reciprocating movement displacement of the operating liquid 18 in the small diameter section 172.

Therefore, the piston E and the elastic membrane 14 are iteratively displaced in a reciprocating manner at the lower end portion of the branch flow path 13a and the open end portion 172a of the small diameter section 172. The iterative up and down displacement of the oscillator 22, the iterative up and down displacement of the pistons C and E, and the iterative reciprocating movement displacement of the operating liquid 18 all correspond to oscillation.

The reciprocating displacement of the piston E and the elastic membrane 14 act on the sample liquid and bubbles (in particular, the bubbles in and near the branch flow path 13a) in the main container 3, from the region surrounded by the open end portion 172a, and iteratively decreases and increases the pressure that acts on the sample liquid and the bubbles. At this time, the variable throttle valves 11a, 11b, and 11c function as resistance portions and apply resistance to the flow of liquid between the inside and the outside of the main flow path 3a. Therefore, increases and decreases in the pressure caused by the reciprocating displacement of the piston E and the elastic membrane 14 effectively act on the bubbles.

In this way, the volume of the bubbles can be iteratively decreased and increased by iteratively decreasing and increasing the pressure that acts on the bubbles. When the volume of the bubbles is iteratively increased and decreased, shearing occurs in the sample liquid around the bubbles. As a result, the viscosity of the sample liquid around the bubbles decreases, and the bubbles rise rapidly in the liquid due to buoyancy.

The bubbles that have risen in the sample liquid move along the upper end portion of the main flow path 3a with the flow of liquid in the main flow path 3a, and flow out together with the sample liquid from the bubble outlet 3c to the recovery pipe 15a via the variable throttle valve 11b.

The lower passage 3e that connects to the liquid outlet 3d is an inclined flow path that heads downward at an angle following the flow of the sample liquid, so the likelihood that bubbles that have risen due to buoyancy will enter the lower passage 3e is low, as described above, and as a result, liquid that includes almost no bubbles will flow out from the liquid outlet 3d.

In this way, bubbles are able to be continuously removed from the target liquid by iteratively and repeatedly pressurizing and depressurizing the target liquid via the piston C and the like, while continuously supplying target liquid into the main flow path 3a.

Also, the opening area of the open end portion 171a of the large diameter section 171 is much larger than the opening area of the open end portion 172a of the small diameter section 172. In other words, the sectional area orthogonal to the direction X1 of the piston C is much larger than the sectional area orthogonal to the direction X2 of the piston E and the area of the lower surface of the elastic membrane 14.

Therefore, the displacement amount of the operating liquid 18 at the open end portion 172a of the small diameter section 172 is larger than the displacement amount of the operating liquid 18 on the open end portion 171a side of the large diameter section 171 when the piston C is displaced in a reciprocating manner. As a result, the amplitudes of the piston E and the elastic membrane 14 are greater than the amplitude of the piston C. Consequently, the amount of change in the pressure of the sample liquid and the bubbles in the main container 3 becomes greater near the branch flow path 13a in the main flow path 3a, and the amount of change in the increase and decrease in the volume of the bubbles also increases. Therefore, the efficiency with which the bubbles are made to rise and are removed improves.

Also, the pressurization container 17 displays an effect of amplifying the amplitude of the piston C and transmitting this amplified amplitude to the piston E and the elastic membrane 14 to increase the amplitudes thereof, so the amplitudes of the piston E and the elastic membrane 14 can be made even larger without changing the amplitude of the oscillation generated by the cam 21.

With regards to the amplitudes of the piston C and the piston E, the relationships below hold.

$$\Delta Ve = Se \times \Delta he$$

$$\Delta Vc = Sc \times \Delta hc$$

where the sectional area of the piston C is Sc, the change in volume of the pressurization container 17 due to displacement of the piston C is $\Delta Vc$, the amount of displacement of the piston C is $\Delta hc$, the sectional area of the piston E is Se, the change in the volume of the main container 3 due to displacement of the piston E is $\Delta Ve$, and the amount of displacement of the piston E is $\Delta he$. Because the volume of the operating liquid 18 inside is equal, $\Delta Vc = \Delta Ve$ and $Sc \times \Delta hc = Se \times \Delta he$. Therefore, if $\Delta he = (Sc/Se) \times \Delta hc$ and $Se < Sc$, then $\Delta he > \Delta hc$.

Figure 4:
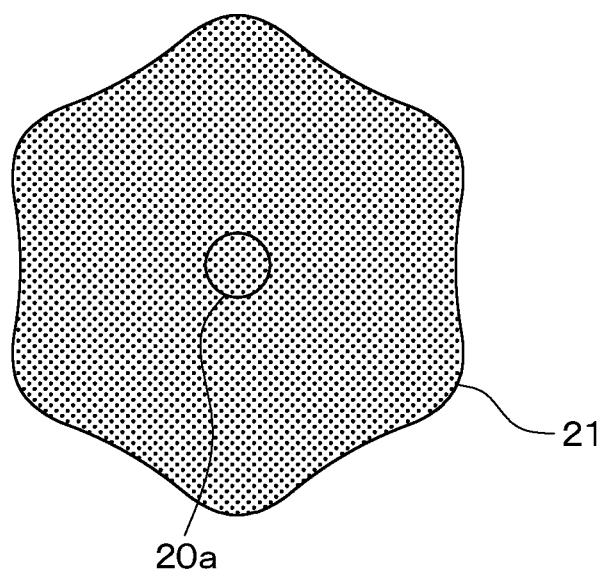
FIG. 4 is a view taken along line IV of a cam in FIG. 1.

The configuration of the drive mechanism 19 for driving the piston C is as described above, but the details of the operation thereof will be described below. First, the shape of the cam 21 for applying oscillation to the oscillator 22 is as shown in FIG. 4. However, in FIG. 4, in order to facilitate understanding of the shape, the height of the noses is 30 times the actual height. More specifically, the height of the noses is 0.1 mm (the amplitude is 0.05 mm), the number of noses is 6, and the shape of the noses is a modified sine curve. Here, the sectional area Sc of the piston C is 491 mm² (25 mm diameter) and the sectional area Se of the piston E is 50 mm² (8 mm diameter), so the displacement amount $\Delta he$ of the piston E becomes approximately 1 mm (the amplitude is approximately 0.5 mm) due to the amplification effect.

In the present embodiment, 200 Hz is used as the frequency at which oscillation is applied, but the frequency at which oscillation is applied may preferably be any frequency of 4000 Hz or lower. For example, the frequency at which oscillation is applied may be 150 Hz. That is, the oscillation frequency, the pressure fluctuation range, and the phase are set such that the fluid viscosity near bubbles decreases due to shearing.

As a comparative example, the apparatus described in International Publication No. WO 2013/021849 that uses a speaker system type oscillation generator is used as an oscillation generating source. Even when there is no load, the capacity of this oscillation generator is a maximum amplitude of 0.4 mm at 200 Hz, and when there is a load, the capacity is even smaller than this. The test conditions of the cam system of this example and the speaker system of the comparative example are as shown in Table 1 below.

TABLE 1

| METHOD FOR OSCILLATION | FREQUENCY (Hz) | BUBBLE RADIUS (mm) | FLOW RATIO | TOTAL FLOW RATE (g/min) |
|---|---|---|---|---|
| CAM | 200 | 1.28 | 0.78 | 1.96 |
| SPEAKER | 300 | 1.40 | 0.8 | 2.0 |

Here, the flow ratio is the ratio of the amount that flows out from the liquid outlet 3d with respect to the total flow rate.

Next, the growth and shrinkage of the bubbles will be evaluated. The volumetric shrinkage rate $\alpha$ [%] is expressed by the following equation.

$$\alpha = (V\max - V\min)/V\min \times 100$$

When the bubble radius $r = r_0 + A \times \sin(\omega t)$,
the bubble surface velocity $u = dr/dt = A \times \omega \times \cos(\omega t)$, and
the derivative value $u_r$ of radial speed $= du/dr = (1/\Delta t)[(r|_t/r|_{t+\Delta t})^2 - 1]$, the shear rate $\gamma\_dot[s^{-1}]$ is defined by the following equation.

$$\gamma\_dot = (2S:S)^{1/2} = (2u_r^2 + 4u^2/r^2)^{1/2}$$

where Vmax is the maximum volume of the bubble, Vmin is the minimum volume of the bubble, $r_0$, A, and $\omega$ are constants, and S is a deformation rate tensor. Also, $r|_t$ is the bubble radius at time t, and $r|_{t+\Delta t}$ is the bubble radius at time $t+\Delta t$. $\Delta t$ is the period of time of half a cycle of oscillation of the bubble radius. Regarding the results of the test, the comparison results of the volumetric shrinkage rate and the shear rate are as shown in Table 2 below.

TABLE 2

| METHOD FOR OSCILLATION | OUTPUT AMPLITUDE (mm) | VOLUMETRIC SHRINKAGE RATE $\alpha$ [%] | SHEAR RATE $\gamma$ [$s^{-1}$] |
|---|---|---|---|
| CAM | 0.5 mm | 42.20 | 289.02 |
| SPEAKER | EQUAL TO OR LESS THAN 0.05 mm | 25.10 | 214.11 |

With the shrinkage rate focused only on the change in the bubble radius due to growth and shrinkage, the cam system exhibited a change in the bubble radius of 1.8 times that of the speaker system, and the shear rate was a larger value. Therefore, the cam system is found to be able to transmit stronger pressure oscillation to bubbles than the speaker system, and the degassing effect is also improved, compared to the speaker system.

In this way, with the present embodiment, the area of the piston C is larger than the area of the piston E, so stronger pressure oscillation is able to be applied to the sample liquid and the bubbles while suppressing the amplitude of the oscillator 22. Therefore, the bubble removal rate can be improved while suppressing an increase in size of the drive mechanism 19 for removing bubbles.

As described above, in the present embodiment, there is a step of preparing the continuous bubble removal apparatus 1, and a step of flowing target liquid that includes bubbles through the main container 3. Also, by displacing the piston C in a reciprocating manner while supporting the piston C with the open end portion 171a of the large diameter section 171, target liquid is iteratively pressurized and depressurized from a region surrounded by the open end portion 172a of the small diameter section 172, via the operating liquid 18. As a result, the volume of the bubbles is able to be iteratively decreased and increased. Also, the opening area of the open end portion 171a of the large diameter section 171 is larger than the opening area of the open end portion 172a of the small diameter section 172.

In this way, the opening area of the open end portion 171a that supports the piston C is larger than the opening area of the open end portion 172a that is the path along which pressurization and depressurization according to the reciprocating displacement of the piston C is transmitted to the target liquid is transmitted. Therefore, the amplitude of the pressure applied to the target liquid from the open end portion 172a is able to be increased compared to when the pressurization container 17 is not provided, while inhibiting the amplitude of the displacement of the piston C. As a result, the bubble removal rate is able to be improved while suppressing an increase in size of the drive mechanism for removing bubbles.

Also, the elastic membrane 14 is attached to the end portion on the pressurization container 17 side of the main container 3 to provide a seal for the target liquid. Also, the piston E is attached to the open end portion 172a of the pressurization container 17 to provide a seal for the operating liquid 18.

By doing so, it is possible to reduce the likelihood of the operating liquid and the target liquid leaking between the main container 3 and the pressurization container 17. Also, sealing is provided with both the main container 3 and the pressurization container 17. Therefore, even if a problem occurs in the module including the piston C and the piston E and the module detaches from the main container 3, the likelihood that the target liquid and the operating liquid 18 will leak out is reduced.

Note that in the present embodiment, the pressurization container 17 corresponds to a basic pressurization container, and the piston C corresponds to a basic movable portion. Also, the open end portion 171a on the lower side of the large diameter section 171 corresponds to a basic supporting portion, and the open end portion 172a on the upper side of the small diameter section 172 corresponds to a basic connecting portion. Also, the operating liquid 18 corresponds to a basic operating liquid. Further, the cam 21 corresponds to a basic cam. Also, the elastic membrane 14 corresponds to a main container side sealing body, and the piston E corresponds to a connecting portion side sealing body.

Second Embodiment

Figure 5:
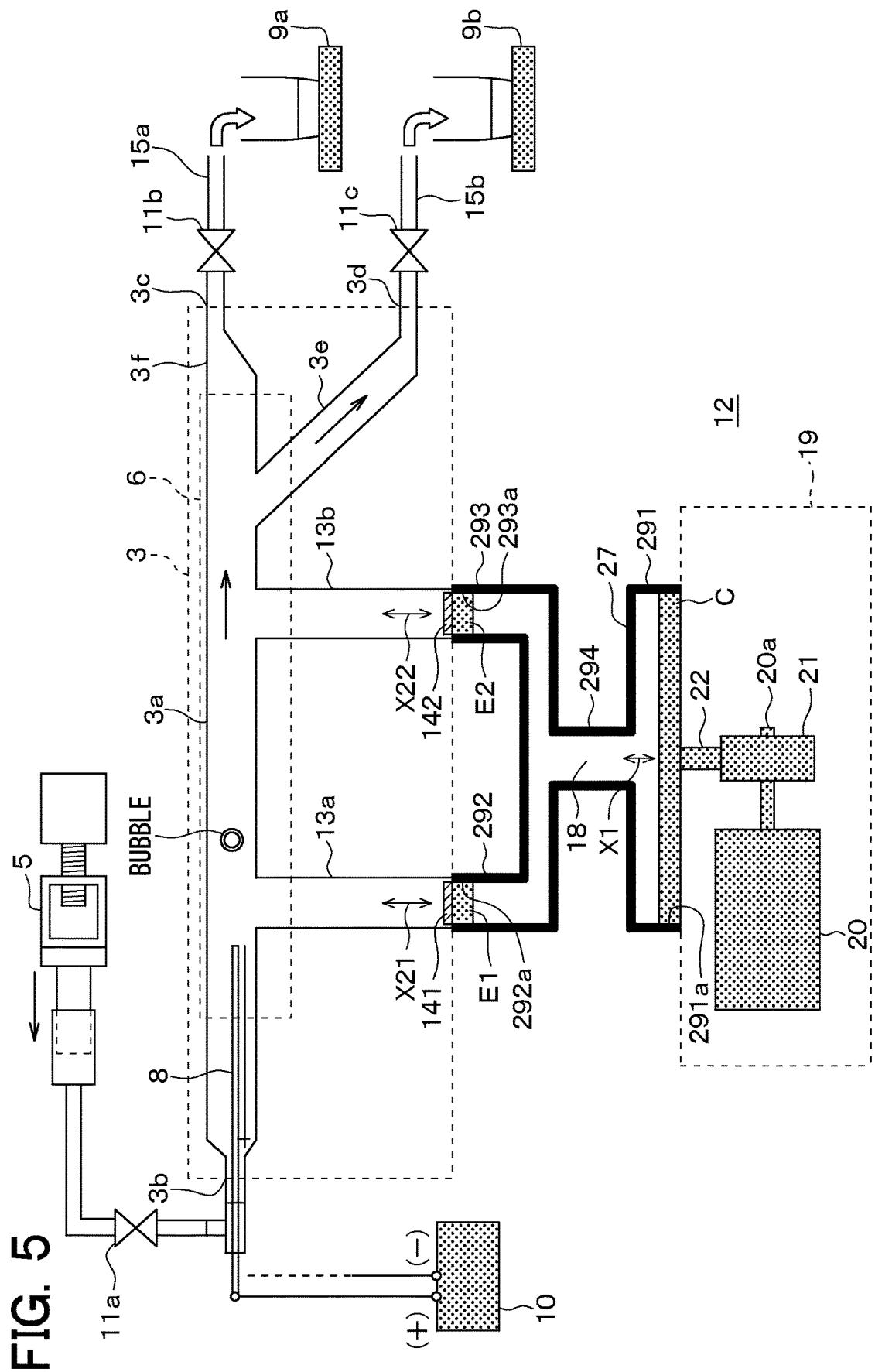
FIG. 5 is a view showing a frame format of the overall configuration of a continuous bubble removal apparatus according to a second embodiment.

Hereinafter, a second embodiment will be described. The configuration of a continuous bubble removal apparatus 12 of the present embodiment is as shown in FIG. 5. Portions of the continuous bubble removal apparatus 12 of the present embodiment that are common to the continuous bubble removal apparatus 1 of the first embodiment will be denoted by the same reference signs as those in the first embodiment, and descriptions of those portions will be omitted.

As shown in FIG. 5, the feature in which the main container 3 is provided with the main flow path 3a, the liquid inlet 3b, the bubble outlet 3c, the liquid outlet 3d, and the branch flow path 13a is common to the first embodiment. In the present embodiment, the main container 3 is further provided with a second branch flow path 13b.

The branch flow path 13b branches off from the main flow path 3a and extends downward farther downstream than the branch point of the main flow path 3a and the branch flow path 13a, and farther upstream than the outlets 3c and 3d, in the main flow path 3a.

An elastic membrane 141 formed by an elastic body is attached to the lower end (i.e., the end portion on the pressurization container 27 side) of the branch flow path 13a. An outer edge portion of the elastic membrane 141 is fixed to the lower end of the branch flow path 13a, and an upper surface of the elastic membrane 141 contacts the target liquid. The portion other than the outer edge portion of the elastic membrane 141 can be displaced with respect to the branch flow path 13a. This elastic membrane 141 seals the lower end of the branch flow path 13a in a liquid-tight manner, so the target liquid in the main container 3 will not leak out from the lower end of the branch flow path 13a.

An elastic membrane 142 formed by an elastic body is attached to the lower end (i.e., the end portion on the pressurization container 27 side) of the branch flow path 13b. An outer edge portion of the elastic membrane 142 is fixed to the lower end of the branch flow path 13b, and an upper surface of the elastic membrane 142 contacts the target liquid. The portion other than the outer edge portion of the elastic membrane 142 can be displaced with respect to the branch flow path 13b. This elastic membrane 142 seals the lower end of the branch flow path 13b in a liquid-tight manner, so the target liquid in the main container 3 will not leak out from the lower end of the branch flow path 13b.

The pressurization container 27 is connected to the lower ends of the branch flow paths 13a and 13b. The pressurization container 27 has one large diameter section 291, two small diameter sections 292 and 293, and one transfer section 294. The large diameter section 291 and the two small diameter sections 292 and 293 are connected via the transfer section 294. The opening areas of the small diameter sections 292 and 293 are equal to each other, and the opening area of the large diameter section 291 is sufficiently larger than the opening areas of the small diameter sections 292 and 293.

The connection between the pressurization container 27 and the lower end of the branch flow path 13a is realized by connecting an open end portion 292a on the upper side (i.e., the branch flow path 13a side) of the small diameter section 292 to the lower end of the branch flow path 13a. The open end portion 292a is closed off by a piston E1 that is made of resin or the like.

The piston E1 is supported by an inside wall of the open end portion 292a. The piston E1 seals the open end portion 292a in a liquid-tight manner but is able to slide with respect to the inside wall of the open end portion 292a. Therefore, the piston E1 is able to be displaced in a reciprocating manner along an axial direction X21 of the small diameter section 292 while being supported by the inside wall of the open end portion 292a.

Also, the piston E1 and the elastic membrane 141 are displaced in a reciprocating manner in the axial direction X21 while the upper end surface of the piston E1 and the lower end surface of the elastic membrane 141 are in contact with each other. Also, the area of the upper end surface of the piston E1 and the area of the lower end surface of the elastic membrane 141 are substantially the same.

In this way, the branch flow path 13a and the small diameter section 292 are not communicated with each other, as the elastic membrane 141 and the piston E1 separate the branch flow path 13a from the small diameter section 292. However, the operating liquid 18 inside the pressurization container 27 is able to urge the target liquid in the branch flow path 13a via the piston E1 and the elastic membrane 141. The piston E1 and the elastic membrane 141 correspond to a separating body.

The connection between the pressurization container 27 and the lower end of the branch flow path 13b is realized by connecting an open end portion 293a on the upper side (i.e., the branch flow path 13b side) of the small diameter section 293 to the lower end of the branch flow path 13b. The open end portion 293a is closed off by a piston E2 that is made of resin or the like.

The piston E2 is supported by an inside wall of the open end portion 293a. The piston E2 seals the open end portion 293a in a liquid-tight manner but is able to slide with respect to the inside wall of the open end portion 293a. Therefore, the piston E2 is able to be displaced in a reciprocating manner along an axial direction X22 of the small diameter section 293 while being supported by the inside wall of the open end portion 293a.

Also, the piston E2 and the elastic membrane 142 are displaced in a reciprocating manner in the axial direction X22 while the upper end surface of the piston E2 and the lower end surface of the elastic membrane 142 are in contact with each other. Also, the area of the upper end surface of the piston E2 and the area of the lower end surface of the elastic membrane 142 are substantially the same.

In this way, the branch flow path 13b and the small diameter section 293 are not communicated with each other, as the elastic membrane 142 and the piston E2 separate the branch flow path 13b from the small diameter section 293. However, the operating liquid 18 inside the pressurization container 27 is able to urge the target liquid in the branch flow path 13b via the piston E2 and the elastic membrane 142. The piston E2 and the elastic membrane 142 correspond to a separating body.

The piston C is fit into an open end portion 291a on a lower end side of the large diameter section 291. The piston C closes off the open end portion 291a in a liquid-tight manner but is able to be displaced forward and backward along the axial direction X1 of the large diameter section 291 while being supported by the inside wall of the open end portion 291a.

Also, the opening area of the open end portion 291a on the lower end side of the large diameter section 291 is sufficiently larger than the opening area of the open end portion 292a on the upper end side of the small diameter section 292. Also, the opening area of the open end portion 291a is sufficiently larger than the opening area of the open end portion 293a on the upper end side of the small diameter section 293. Furthermore, the opening area of the open end portion 291a is sufficiently larger than the sum of the opening area of the open end portion 292a and the opening area of the open end portion 293a.

As described above, the openings of the pressurization container 27 are closed off in a liquid-tight manner by the piston C, the piston E1, and the piston E2, and the inside of the pressurization container 27 is filled with the operating liquid 18, similar to the first embodiment. The relationship between the piston C and the drive mechanism 19 is just as it is in the first embodiment.

Just as in the first embodiment, the oscillator 22 is iteratively displaced up and down. The piston C is iteratively displaced up and down by this iterative displacement of the oscillator 22.

At this time, the piston C applies iterative force to the operating liquid 18 held in the pressurization container 27 as a result of being displaced up and down with respect to the pressurization container 27 while being supported by the open end portion 291a. Then, the operating liquid 18 displaces the pistons E1 and E2 up and down with respect to the pressurization container 27, in the region surrounded by the open end portions 292a and 293a, in response to receiving iterative force as the piston C is displaced in a reciprocating manner.

That is, the up and down displacement of the piston C acts as displacement that pushes the operating liquid 18 in the small diameter section 292 out through the open end portion 292a and draws the operating liquid 18 back in, i.e., acts as reciprocating movement displacement of the operating liquid 18 in the small diameter section 292. Therefore, the piston E1 is displaced in a reciprocating manner in the open end portion 292a of the small diameter section 292. The up and down displacement of the piston C also acts on the operating liquid 18 in the small diameter section 293, so the piston E2 is displaced in a reciprocating manner in the open end portion 293a of the small diameter section 293.

The reciprocating displacement of the pistons E1 and E2 acts on the target liquid and bubbles in the main container 3 (in particular, the bubbles in and near the branch flow paths 13a and 13b), from the region surrounded by the open end portions 292a and 293a, and causes pressure that acts on the bubbles to iteratively change up and down. At this time, the variable throttle valves 11a, 11b, and 11c function as resistance portions, so increases and decreases in the pressure caused by the reciprocating displacement of the pistons E1 and E2 effectively act on the bubbles. That is, an excitation converter is formed by the pressurization container 27 and the drive mechanism 19.

In this way, the volume of the bubbles is able to be iteratively increased and decreased by iteratively changing the pressure that acts on the bubbles up and down. When the volume of the bubbles iteratively increases and decreases, shearing occurs in the liquid around the bubbles. As a result, the viscosity of the liquid around the bubbles decreases and the bubbles rapidly rise in the liquid.

At this time, it is also conceivable that bubbles near the branch flow path 13a will end up absorbing the pressure change exerted from the branch flow path 13a and as a result that pressure change will not sufficiently reach bubbles in positions that are farther away. However, a pressure change is also exerted from the branch flow path 13b, so this will sufficiently act on bubbles in these farther positions. The bubble removal effect improves because the pressure changes from these two branch flow paths 13a and 13b can be exerted on the bubbles in this way.

Also, the distance from the open end portion 291a of the large diameter section 291 to the open end portion 292a of the small diameter section 292 in the pressurization container 27, and the distance from the open end portion 291a of the large diameter section 291 to the open end portion 293a of the small diameter section 293 in the pressurization container 27, are the same. Therefore, the reciprocating displacements of the pistons E1 and E2 are performed at the same timing (i.e., the same frequency and phase), so the bubble removal effect improves in this regard as well. The discharge of bubbles that have risen in the liquid and the recovery of liquid that does not contain bubbles are performed in the same manner as they are in the first embodiment.

The opening area of the open end portion 291a of the large diameter section 291, i.e., the sectional area orthogonal to the direction X1 of the piston C, is much greater than the opening areas of the open end portions 292a and 293a of the small diameter sections 292 and 293, i.e., the sum of the sectional areas orthogonal to the directions X21 and X22 of the pistons E1 and E2. Therefore, the amount of displacement of the operating liquid 18 in the small diameter sections 292 and 293 is greater than the amount of displacement of the operating liquid 18 on the large diameter section 291 side when the piston C is displaced in a reciprocating manner, and as a result, the amplitudes of the pistons E1 and E2 become larger than the amplitude of the piston C. Consequently, the amount of change in the pressure in the main container 3 increases, so the amount of increase and decrease in the volume of the bubbles also increases. Hence, the efficiency with which bubbles move upward and are removed improves.

With regards to the amplitudes of the piston C and the pistons E1 and E2, the relationships described below hold. That is, when the area of the piston C is Sc, the displacement amount of the piston C is $\Delta hc$, the area of the piston E1 is Se1, the displacement amount of the piston E1 is $\Delta he1$, the area of the piston E2 is Se2, and the displacement amount of the piston E2 is $\Delta he2$, if Se1=Se2, $\Delta he=\Delta he1=\Delta he2$, and Sc>Se=Se1+Se2, then $$\Delta he=\Delta hc\times(Sc/Se)$$

Note that there may also be cases where the expressions Se1=Se2 and $\Delta he1=\Delta he2$ do not hold. For example, Se1 may be greater than Se2 and $\Delta he1$ may be less than $\Delta he2$. Alternatively, Se1 may be less than Se2 and $\Delta he1$ may be greater than $\Delta he2$.

The pressurization container 27 displays an effect of amplifying the amplitude of the piston C and transmitting this amplified amplitude to the pistons E1 and E2 so as to increase the amplitudes of the pistons E1 and E2. Therefore, the amplitudes of the pistons E1 and E2 are able to be further increased without changing the amplitude of the oscillation generated by the cam 21.

Also, by arranging a plurality of oscillatory sources (the pistons E1 and E2 in the embodiment described above) upstream and downstream of the flow of liquid in the main container 3, oscillation can be efficiently transmitted (i.e., attenuation can be suppressed) to each location in the container, even if the flow paths (the main flow path 3a in the embodiment described above) that delivers liquid from the inlet to the outlet is lengthened. Therefore, by lengthening the flow path that delivers liquid from the inlet to the outlet and arranging oscillatory sources upstream and downstream of this flow path, the length of the path along which the bubbles can be moved while sufficiently receiving pressure oscillation can be increased, and consequently, the amount that the bubbles rise can be increased.

Further, assuming a case where there are a plurality of bubbles in the liquid, pressure oscillation applied from one oscillatory source will end up being consumed by the change in volume of the bubbles closest to that oscillatory source and will not sufficiently reach the other bubbles. That is, the pressure oscillation applied by one oscillatory source will end up being shielded by the bubbles closest to that oscillatory source. In contrast, when pressure oscillation is applied to liquid in the main container 3 from a plurality of locations at different positions (which may be, but does not have to be, upstream and downstream) using a plurality of oscillatory sources, even if there are a plurality of bubbles in the liquid, the probability that sufficient pressure oscillation will be able to be applied to each of these bubbles increases.

Also, when pressure oscillation of the same frequency and the same phrase is applied to liquid in the main container 3 from a plurality of locations at different positions (which may be, but does not have to be, upstream and downstream), the different pressure oscillations of the oscillatory sources will interfere with each other in the liquid. Therefore, it is considered that the same effect as when pressure oscillation is applied at different timings will be locally realized at a plurality of positions in the liquid.

Note that in the example described above, the distance from the open end portion 291a of the large diameter section 291 to the open end portion 292a of the small diameter section 292 in the pressurization container 27, and the distance from the open end portion 291a of the large diameter section 291 to the open end portion 293a of the small diameter section 293 in the pressurization container 27, are the same. However, this does not necessarily have to be so. That is, the distance from the open end portion 291a of the large diameter section 291 to the open end portion 292a of the small diameter section 292 in the pressurization container 27, and the distance from the open end portion 291a of the large diameter section 291 to the open end portion 293a of the small diameter section 293 in the pressurization container 27 may be different. Having the distances be different in this way makes it possible to intentionally make the positions at which the oscillations of the pistons E1 and E2 are applied different from each other.

Note that in the present embodiment, the pressurization container 27 corresponds to a basic pressurization container, and the piston C corresponds to a basic movable portion. Also, the open end portion 291a on the lower side of the large diameter section 291 corresponds to a basic supporting portion, the open end portion 292a on the upper side of the small diameter section 292 corresponds to a basic connecting portion, and the open end portion 293a on the upper side of the small diameter section 293 corresponds to an additional connecting portion. Also, the operating liquid 18 corresponds to a basic operating liquid. Further, the cam 21 corresponds to a basic cam. Also, the elastic membranes 141 and 142 correspond to a main container side sealing body, and the pistons E1 and E2 correspond to a connecting portion side sealing body.

Third Embodiment

Figure 6:
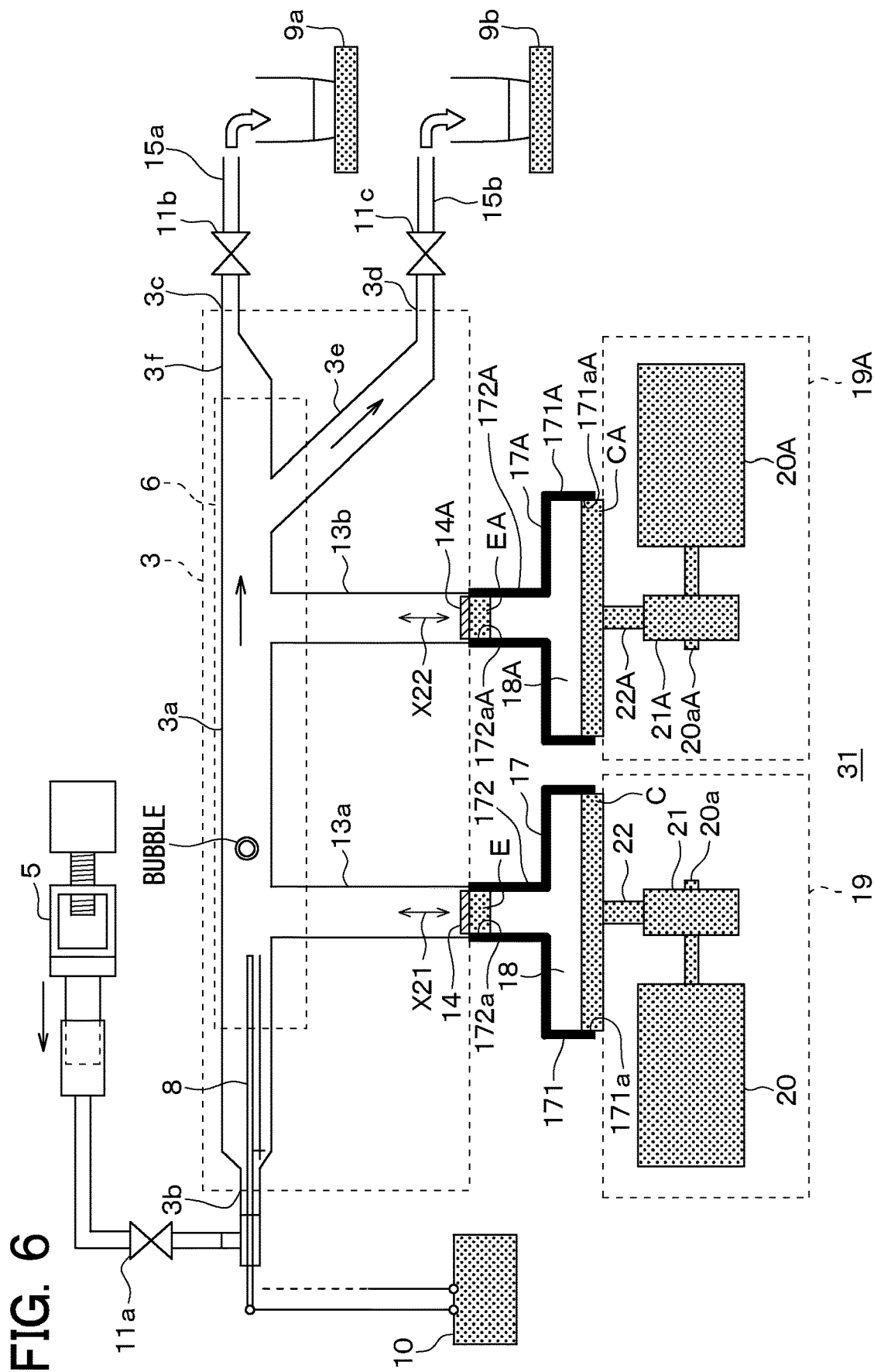
FIG. 6 is a view showing a frame format of the overall configuration of a continuous bubble removal apparatus according to a third embodiment.

Next, a third embodiment will be described. A continuous bubble removal apparatus 31 of the present embodiment is such that the branch flow path 13b, a pressurization container 17A, a drive mechanism 19A, a piston CA, a piston EA, an elastic membrane 14A, and operating liquid 18A are added to the continuous bubble removal apparatus 1 of the first embodiment, just as shown in FIG. 6. The structure of other portions is the same as it is in the continuous bubble removal apparatus 1 of the first embodiment.

The branch flow path 13b branches off from the main flow path 3a and extends downward farther downstream than the branch point of the main flow path 3a and the branch flow path 13a, and farther upstream than the outlets 3c and 3d, in the main flow path 3a.

The elastic membrane 14A formed by an elastic body is attached to the lower end (i.e., the end portion on the pressurization container 17A side) of the branch flow path 13*b*. The manner in which the elastic membrane 14A is attached to the lower end of the branch flow path 13*b* is the same as the manner in which the elastic membrane 14 is attached to the lower end of the branch flow path 13*a*.

The pressurization container 17A is connected to the lower end of the branch flow path 13*b*. The shape and configuration of the pressurization container 17A are the same as they are in the pressurization container 17. More specifically, the pressurization container 17A has a large diameter section 171A and a small diameter section 172A, with the large diameter section 171A having an open end portion 171*a*A on the lower side, and the small diameter section 172A having an open end portion 172*a*A on the upper side. Also, the characteristics and mutual relationships of the large diameter section 171A, the small diameter section 172A, the open end portion 171*a*A, and the open end portion 172*a*A are the same as those of the large diameter section 171, the small diameter section 172, the open end portion 171*a*, and the open end portion 172*a*.

Therefore, the open end portion 172*a*A on the upper side of the small diameter section 172A of the pressurization container 17A is located closer to the main container 3 than the open end portion 171*a*A on the lower side of the large diameter section 171A of the pressurization container 17A. Also, the open end portion 172*a*A connects to the main container 3.

Also, the attaching structure of the pressurization container 17A with respect to the lower end of the branch flow path 13*b* is the same as the attaching structure of the pressurization container 17 with respect to the lower end of the branch flow path 13*a*. In this way, the pressurization container 17A connects to the main container 3 from a different position than the pressurization container 17.

Also, the shape and material of the piston EA are the same as those of the piston E. Also, the manner in which the piston EA is attached to the pressurization container 17A is the same as the manner in which the piston E is attached to the pressurization container 17. Further, the manner in which the piston EA is connected to the elastic membrane 14A is the same as the manner in which the piston E is connected to the elastic membrane 14.

Also, the manner in which the piston CA is connected to the pressurization container 17A is the same as the manner in which the piston C is connected to the pressurization container 17. Therefore, the piston CA is displaceably attached to the pressurization container 17A. Also, the piston CA is supported by an inside wall of the open end portion 171*a*A on the lower side of the large diameter section 171A of the pressurization container 17A, when displaced in a reciprocating manner with respect to the pressurization container 17A.

The operating liquid 18A is held in the pressurization container 17A, and is dammed up between the piston CA and the piston EA, in the pressurization container 17A, by the piston CA and the piston EA. The composition of the operating liquid 18A is the same as that of the operating liquid 18.

The configuration of the drive mechanism 19A for driving the piston CA is the same as that of the drive mechanism 19. More specifically, the drive mechanism 19A includes a motor 20A, a cam 21A, and an oscillator 22A, and the motor 20A has an output shaft 20*a*A. Also, the characteristics and mutual relationships of the motor 20A, the cam 21A, the oscillator 22A, and the output shaft 20*a*A are the same as those of the motor 20, the cam 21, the oscillator 22, and the output shaft 20*a*. Also, the relationship between the oscillator 22A of the drive mechanism 19A and the piston CA is the same as the relationship between the oscillator 22 of the drive mechanism 19 and the piston C.

In this way, the continuous bubble removal apparatus 31 includes two sets of excitation converters, one formed by the pressurization container 17 and the drive mechanism 19, and the other formed by the pressurization container 17A and the drive mechanism 19A.

With the continuous bubble removal apparatus 31 of the present embodiment, it is possible to operate only one of the excitation converters (for example, the set of the pressurization container 17 and the drive mechanism 19), and the operation and effect in this case are the same as they are in the first embodiment.

Also, by operating both of the two sets of excitation converters, a pressure change from the two branch flow paths 13*a* and 13*b* is able to be exerted on the bubbles, just as in the second embodiment. Therefore, in this case, the bubble removal effect improves, just as in the second embodiment.

When operating both of the two sets of excitation converters, it is possible to arbitrarily set the amplitudes, frequencies, and phases of the pistons C and CA independently of each other by changing the shapes of the cams 21 and 21A of the drive mechanisms 19 and 19A, or changing the rotation speeds of the cams 21 and 21A.

Therefore, it is possible to arbitrarily set the amplitudes, frequencies, and phases of the pressure changes exerted on the main container 3 by the pistons E and EA and the elastic membranes 14 and 14A independently of each other. Also, any or all of the amplitudes, frequencies, and phases can also be set the same.

Also, by simply depressurizing or pressurizing the inside of the main container 3 at the same timing (for example, with continuous oscillation of the same frequency and the same phase) from different positions (the branch flow paths 13*a* and 13*b*) of the main container 3, a greater bubble removal effect can be obtained compared to when depressurizing and pressurizing the inside of the main container 3 from only one position.

This is because there is a limit to the output (amount of change in volume, pressure force, etc.) when depressurizing and pressurizing from one location (for example, from the branch flow path 13*a* by the set of the pressurization container 17 and the drive mechanism 19) as a result of limitations due to performance and the like of the drive mechanisms 19 and 19A, so by depressurizing and pressurizing from a plurality of locations, the liquid is able to be depressurized and pressurized by output that exceeds this limit on the whole.

Note that in the present embodiment, the pressurization container 17 corresponds to a basic pressurization container, and the piston C corresponds to a basic movable portion. Also, the pressurization container 17A corresponds to another pressurization container, and the piston CA corresponds to another movable portion. Further, in the pressurization container 17, the open end portion 171*a* on the lower side of the large diameter section 171 corresponds to a basic supporting portion, and the open end portion 172*a* on the upper side of the small diameter section 172 corresponds to a basic connecting portion. Also, in the pressurization container 17A, the open end portion 171*a*A on the lower side of the large diameter section 171A corresponds to another supporting portion, and the open end portion 172*a*A on the upper side of the small diameter section 172A corresponds to another connecting portion. Also, the operating liquid 18 corresponds to a basic operating liquid, and the operating liquid 18A corresponds to another operating liquid. Further, the cams 21 and 21A correspond to a basic cam. Further, the elastic membranes 14 and 14A correspond to a main container side sealing body, and the pistons E and EA correspond to a connecting portion side sealing body.

Fourth Embodiment

Next, a fourth embodiment will be described. The present embodiment differs from the third embodiment in that the two drive mechanisms 19 and 19A are replaced with one drive mechanism 19B. The configurations of portions other than the drive mechanism of the present embodiment are the same as they are in the third embodiment.

Figure 7:
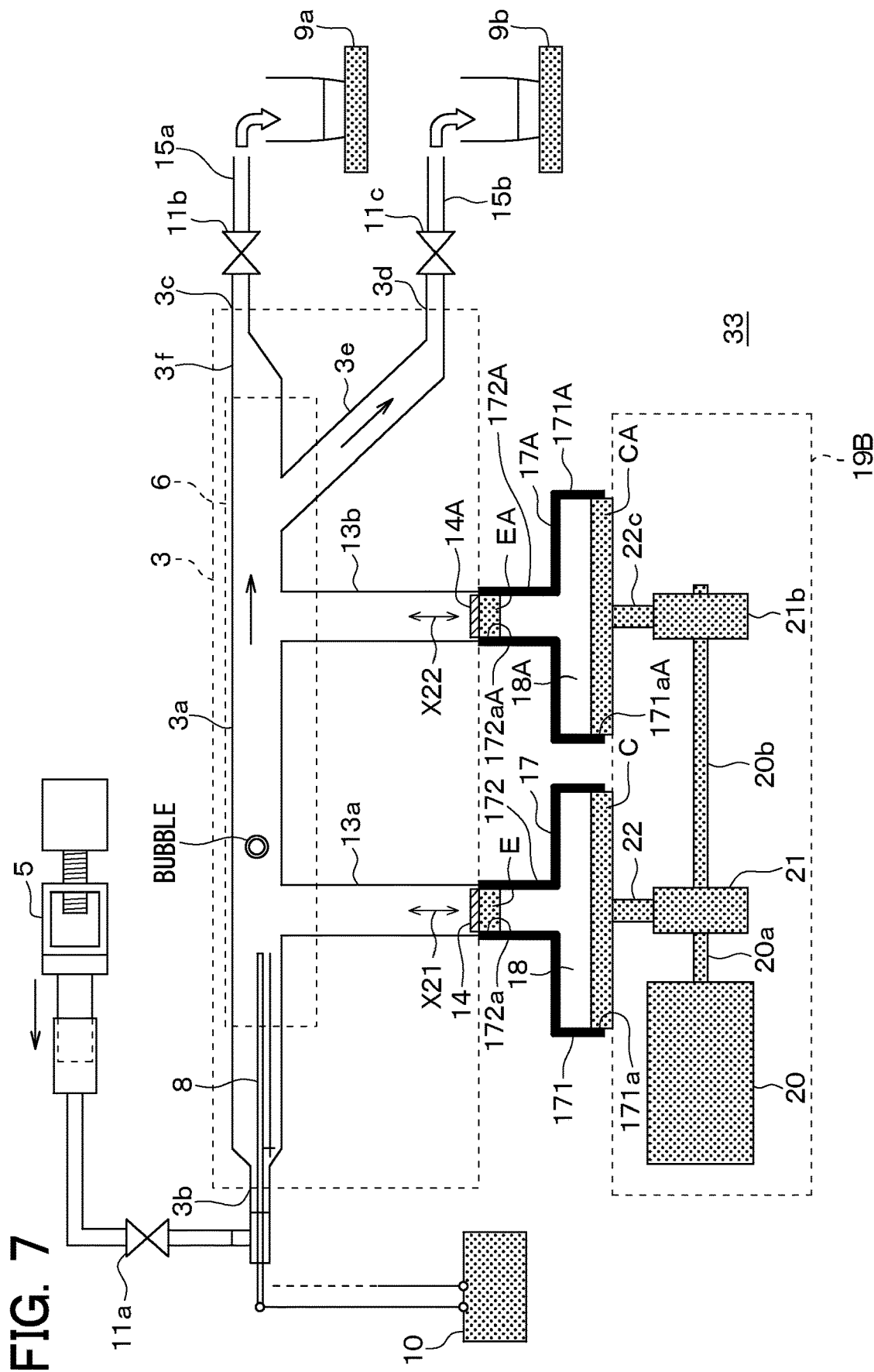
FIG. 7 is a view showing a frame format of the overall configuration of a continuous bubble removal apparatus according to a fourth embodiment.

As shown in FIG. 7, the drive mechanism 19B of a continuous bubble removal apparatus 33 of the present embodiment includes the motor 20, an extended output shaft 20b, the cam 21, a cam 21b, the oscillator 22, and an oscillator 22c. The motor 20, the output shaft 20a of the motor 20, the cam 21, and the oscillator 22 are the same as the motor 20, the output shaft 20a, the cam 21, and the oscillator 22 in the third embodiment.

The extended output shaft 20b is connected coaxially with the output shaft 20a and rotates together and coaxially with the output shaft 20a. Also, the extended output shaft 20b extends through the cam 21 to the cam 21b. That is, the cam 21 is attached to the extended output shaft 20b on the side near a casing of the motor 20, and the cam 21b is attached to the extended output shaft 20b on the side near the tip end of the extended output shaft 20b.

The oscillator 22 that is driven by the cam 21 is connected to the piston C of the pressurization container 17, and the oscillator 22c that is driven by the cam 21b is connected to the piston CA of the pressurization container 17A. The relationship between the oscillator 22 and the piston C is the same as it is in the third embodiment. The relationship between the oscillator 22c and the piston CA is the same as the relationship between the oscillator 22A of the drive mechanism 19A and the piston CA in the third embodiment.

Because of this configuration, the cams 21 and 21b rotate in synchronization with each other due to being driven by the motor 20. Therefore, the setting to make the frequencies and phases of the reciprocating displacements of the pistons C and CA of the two pressurization containers 17 and 17A match or be different from each other is simple and reliable.

Also, in addition to the effects described above, the continuous bubble removal apparatus 33 of the present embodiment displays the same effects as those of the first embodiment, the second embodiment, or the third embodiment.

Note that in the present embodiment, the pressurization container 17 corresponds to a basic pressurization container, and the piston C corresponds to a basic movable portion. Also, the pressurization container 17A corresponds to another pressurization container, and the piston CA corresponds to another movable portion. Also, in the pressurization container 17, the open end portion 171a on the lower side of the large diameter section 171 corresponds to a basic supporting portion, and the open end portion 172a on the upper side of the small diameter section 172 corresponds to a basic connecting portion. Also, in the pressurization container 17A, the open end portion 171aA on the lower side of the large diameter section 171A corresponds to another supporting portion, and the open end portion 172aA on the upper side of the small diameter section 172A corresponds to another connecting portion. Also, the operating liquid 18 corresponds to a basic operating liquid, and the operating liquid 18A corresponds to another operating liquid. Further, the cam 21 corresponds to a basic cam, and the cam 21b corresponds to another cam. Also, the elastic membranes 14 and 14A correspond to a main container side sealing body, and the pistons E and EA correspond to a connecting portion side sealing body.

Fifth Embodiment

Next, a fifth embodiment will be described with reference to FIG. 8 to FIG. 13. In the first to the fourth embodiments described above, a piston is used as the movable portion of the pressurization container, but in the present embodiment, an elastic membrane formed by an elastic body is used instead of the piston.

Figure 8:
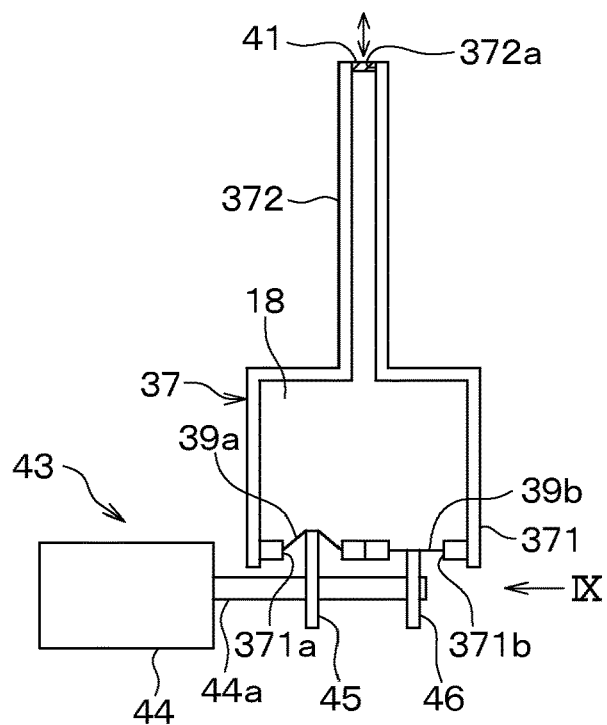
FIG. 8 is a view showing a frame format of a pressurization container and a drive mechanism used in a continuous bubble removal apparatus according to a fifth embodiment.

More specifically, in the present embodiment, the set of the pressurization container and the drive mechanism in the first and third embodiments is replaced by a set of a pressurization container 37 and a drive mechanism 43 shown in FIG. 8. The object to be replaced by the set of the pressurization container 37 and the drive mechanism 43 is the set of the pressurization container 17 and the drive mechanism 19 in the first embodiment. Also, the object to be replaced by the set of the pressurization container 37 and the drive mechanism 43 may be one or both of the set of the pressurization container 17 and the drive mechanism 19, and the set of the pressurization container 17A and the drive mechanism 19A, in the third embodiment.

As shown in FIG. 8, the pressurization container 37 of the present embodiment includes a large diameter section 371 and a small diameter section 372. The large diameter section 371 and the small diameter section 372 are connected together, with the small diameter section 372 being located closer to the side with an object to be attached than the large diameter section 371. The object to be attached is the branch flow path 13a when applied to the first embodiment and is one or both of the branch flow path 13a and the branch flow path 13b when applied to the third embodiment.

The connection between the pressurization container 37 and the lower end of the object to be attached is realized by connecting an open end portion 372a on the upper side (i.e., the side with the object to be attached) of the small diameter section 372 to the lower end of the object to be attached. The open end portion 372a is closed off by an elastic membrane 41 formed by an elastic body.

An outer edge portion of the elastic membrane 41 is fixed to the open end portion 372a. Also, a lower side surface of the elastic membrane 41 is in contact with the operating liquid 18. Also, an upper side surface of the elastic membrane 41 is in contact with the target liquid. The portion other than the outer edge portion of the elastic membrane 41 is able to be displaced in a reciprocating manner in the vertical direction with respect to the pressurization container 37 and the object to be attached.

This elastic membrane 41 seals the upper end of the pressurization container 37 in a liquid-tight manner. Therefore, the operating liquid 18 in the pressurization container 37 will not leak out from the open end portion 372a of the small diameter section 372.

In this way, the object to be attached and the small diameter section 372 are not communicated together, as the elastic membrane 41 separates the object to be attached from the pressurization container 37. However, the operating liquid 18 in the pressurization container 37 is able to urge the target liquid in the object to be attached via the elastic membrane 41 and the elastic membrane 14 on the main container 3 side. The elastic membrane 41 corresponds to a separating body.

Two separated open end portions 371a and 371b are formed on the lower end side of the large diameter section 371. An elastic membrane 39a formed by an elastic body is attached to an inside wall of the open end portion 371a. An elastic membrane 39b formed by an elastic body is attached to an inside wall of the open end portion 371b.

An outer edge portion of the elastic membrane 39a is fixed to the open end portion 371a. Also, an outer edge portion of the elastic membrane 39b is fixed to the open end portion 371b. Further, upper side surfaces of the elastic membranes 39a and 39b are in contact with the operating liquid 18. The portions other than the outer edge portion of the elastic membranes 39a and 39b are able to be displaced, independent of each other, in a reciprocating manner in the vertical direction with respect to the pressurization container 37.

That is, the elastic membrane 39a is able to be displaced in a reciprocating manner while being supported by the open end portion 371a, and the elastic membrane 39b is able to be displaced in a reciprocating manner while being supported by the open end portion 371b. The elastic membranes 39a and 39b seal the lower end of the pressurization container 37 in a liquid-tight manner. Therefore, the operating liquid 18 in the pressurization container 37 will not leak out from the lower end of the pressurization container 37.

Also, the opening area of the open end portion 371a is sufficiently larger than the opening area of the open end portion 372a on the upper end side of the small diameter section 372. Also, the opening area of the open end portion 371b is also sufficiently larger than the opening area of the open end portion 372a. The opening area of the open end portion 371a and the opening area of the open end portion 371b may be the same or they may be different.

The three openings of the pressurization container 37 are sealed in a liquid-tight manner by the elastic membranes 41, 39a, and 39b as described above, and the inside of the pressurization container 37 is filled with the operating liquid 18. The composition of the operating liquid 18 is the same as it is in the first embodiment.

Figure 9:
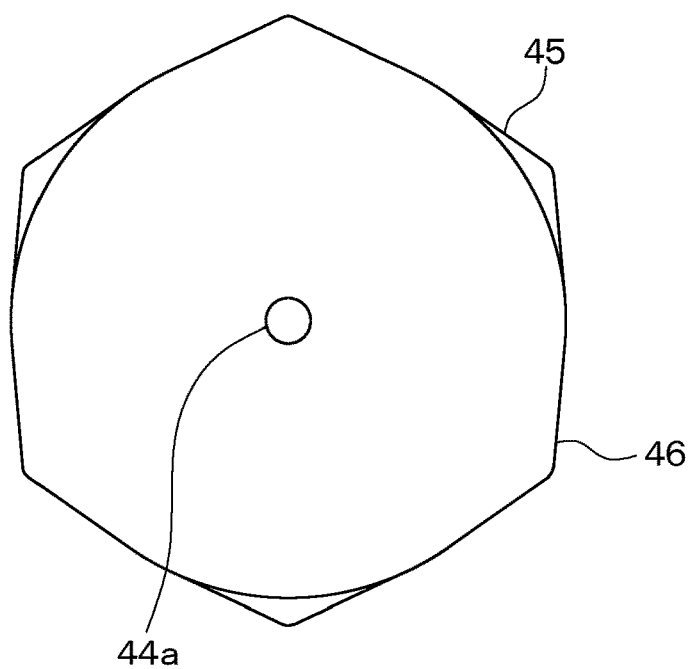
FIG. 9 is a view taken along line IX in FIG. 8.

The drive mechanism 43 for displacing the elastic membranes 39a and 39b is formed by a motor 44 and two cams 45 and 46 that are attached to an output shaft 44a of the motor 44. As shown in FIG. 9, the shapes of the cams 45 and 46 are the same, with both having three noses, but the phases of both are offset by 60 degrees. The cam 45 is in contact with a lower surface of the elastic membrane 39a and the cam 46 is in contact with a lower surface of the elastic membrane 39b.

Figure 10:
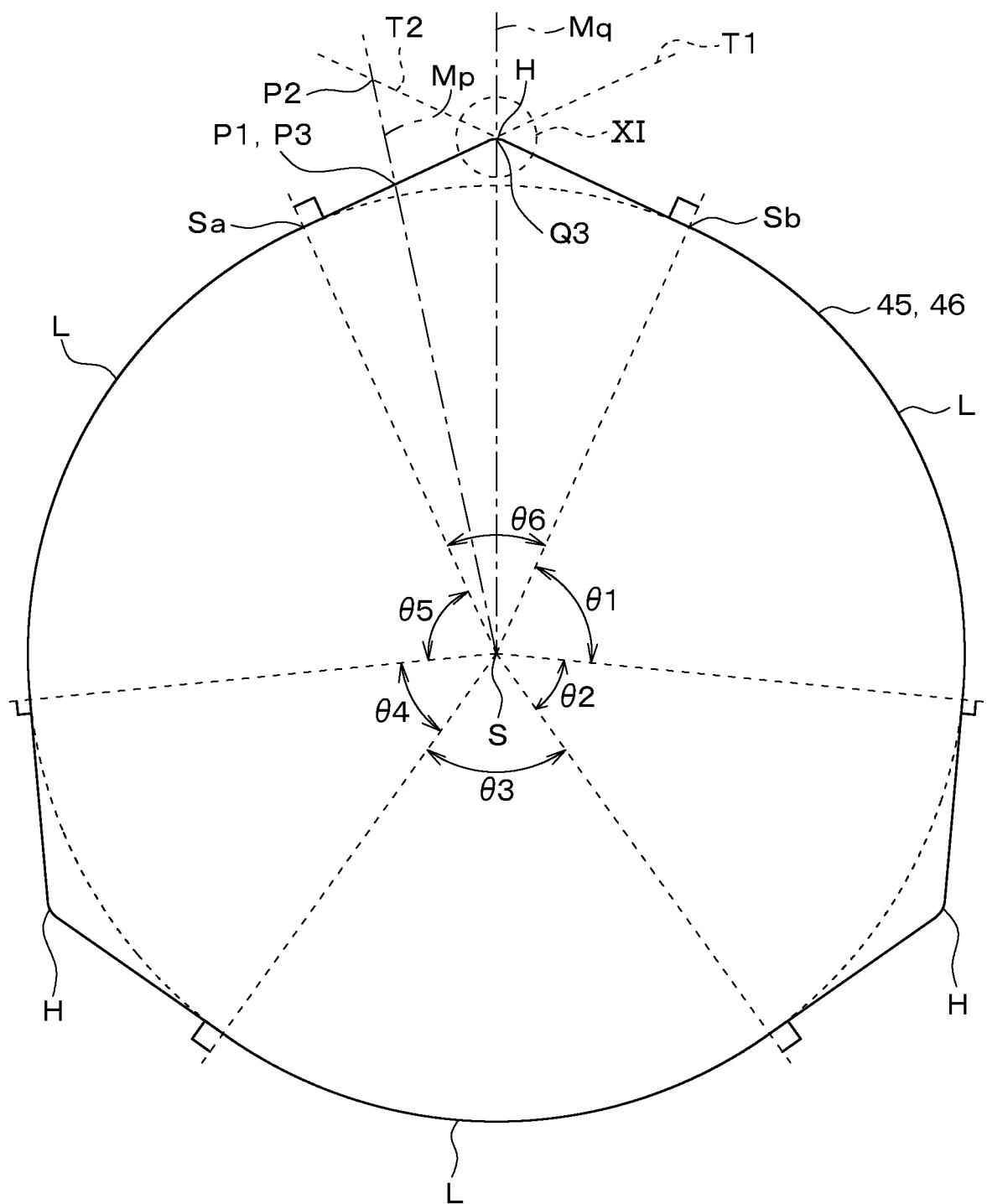
FIG. 10 is a detail view of a cam used in the continuous bubble removal apparatus according to the fifth embodiment.
Figure 11:
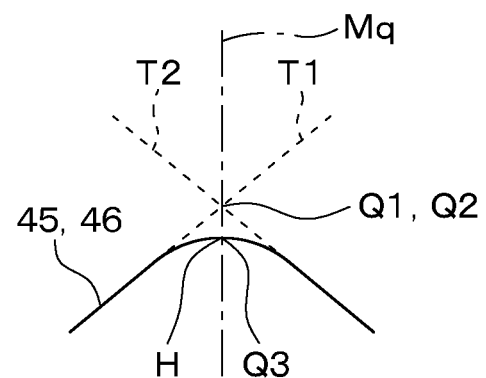
FIG. 11 is an enlarged view of portion XI in FIG. 10.

The particular shape of the outer circumferential surface (i.e., the cam surface) that abuts against the elastic membranes 39a and 39b, of the cams 45 and 46, is as shown by the solid line in FIG. 10 and FIG. 11. A cut formed by cutting the outer circumferential surface of the cams 45 and 46 along a cross section orthogonal to the rotational axis of the cams will hereinafter be referred to as the outer circumferential line of the cams 45 and 46. The description of the shape of the outer circumferential line of the cams 45 and 46 given below also applies to an outer circumferential line obtained by cutting the outer circumferential surface of the cams 45 and 46 along any cross section orthogonal to the rotational axis of the cams.

A lowest displacement portion L to which the distance from the rotational center S of the cams 45 and 46 is the smallest, of the outer circumferential line of the cams 45 and 46, exists across all of three angular ranges $\theta 1$, $\theta 3$, and $\theta 5$ in the circumferential direction as viewed from the axial center of the cams 45 and 46. Also, a continuous stretch of a portion to which the distance from the rotational center S is greater than that at the lowest displacement portion L, of the outer circumferential line of the cams 45 and 46, is a high displacement portion. There are a total of three high displacement portions, one in the angular range $\theta 2$, one in the angular range $\theta 4$, and one in the angular range $\theta 6$, in the circumferential direction as viewed from the axial center of the cams 45 and 46.

Also, a highest displacement portion H where the distance from the rotational center S is the greatest, of the outer circumferential line of the cams 45 and 46, exists at each of the center position of the angular range $\theta 2$, the center position of the angular range $\theta 4$, and the center position of the angular range $\theta 6$. These three highest displacement portions H correspond to tops of the noses of the cams 45 and 46.

At each continuous stretch of high displacement portion, the following holds. For each of all of the half lines (for example, half lines Mp and Mq) passing through the high displacement portion with the rotational center S as the starting point, the following holds.

Intersection points of a tangent line (for example, tangent line T1) tangent to the outer circumferential line at an end (for example, end Sa) on one side of the high displacement portion and the half lines are set as first intersection points. An intersection point P1 corresponds to a first intersection point corresponding to the half line Mp, and an intersection point Q1 corresponds to a first intersection point corresponding to the half line Mq.

Also, intersection points of a tangent line (for example, tangent line T2) tangent to the outer circumferential line at an end (for example, end Sb) on the other side of the high displacement portion and the half lines are set as second intersection points. An intersection point P2 corresponds to a second intersection point corresponding to the half line Mp, and an intersection point Q2 corresponds to a second intersection point corresponding to the half line Mq.

Also, intersection points of the high displacement portion and the half lines are third intersection points. An intersection point P3 corresponds to a third intersection point corresponding to the half line Mp, and an intersection point Q3 corresponds to a third intersection point corresponding to the half line Mq. The first intersection point P1 and the third intersection point P3 coincide. Also, the first intersection point Q1 and the second intersection point Q2 also coincide.

At these plurality of sets of the first intersection points, the second intersection points, and the third intersection points, a predetermined relationship exists among a first intersection point, a second intersection point, and a third intersection point (for example, P1, P2, and P3) within the same set. More specifically, a relationship exists in which the shorter of the linear distance from the rotational center S to the first intersection point and the linear distance from the rotational center to the second intersection point is equal to or greater than the linear distance from the rotational center S to the third intersection point.

For example, the shorter of the linear distance from the rotational center S, of the first intersection point P1 and the second intersection point P2, among the intersection points P1, P2, and P3 on the half line Mp, is the first intersection point P1. Also, the first intersection point P1 and the third intersection point P3 coincide, so the linear distance from the rotational center S to the first intersection point P1 is the same as the linear distance from the rotational center S to the third intersection point P3. In this case, the tangent line T1 and the outer circumferential line of the cams 45 and 46 coincide on the half line Mp.

In the example in FIG. 10, at a large portion of the lowest displacement portion, excluding the highest displacement portion H and therearound, the tangent line T1 or the tangent line T2 and the outer circumferential line of the cams 45 and 46 coincide.

Also, for example, among the intersection points Q1, Q2, and Q3 on the half line Mq, the first intersection point Q1 and the second intersection point Q2 are the same linear distance from the rotational center S. Also, the linear distances from the rotational center S to the first intersection point Q1 and the second intersection point Q2 are longer than the linear distance from the rotational center S to the third intersection point Q3. In this case, the outer circumferential line of the cams 45 and 46 is closer to the rotational center S than either of the tangent lines T1 and T2, on the half line Mq.

As a result of this configuration, the resistance force of the elastic membranes 39a and 39b against the rotation of the cams 45 and 46 is relatively small, so the load on the cams 45 and 46 is low. This effect is more prominent when the angles of the angular ranges θ2, θ4, and θ6 are equal to or less than 60°, for example.

Figure 12:
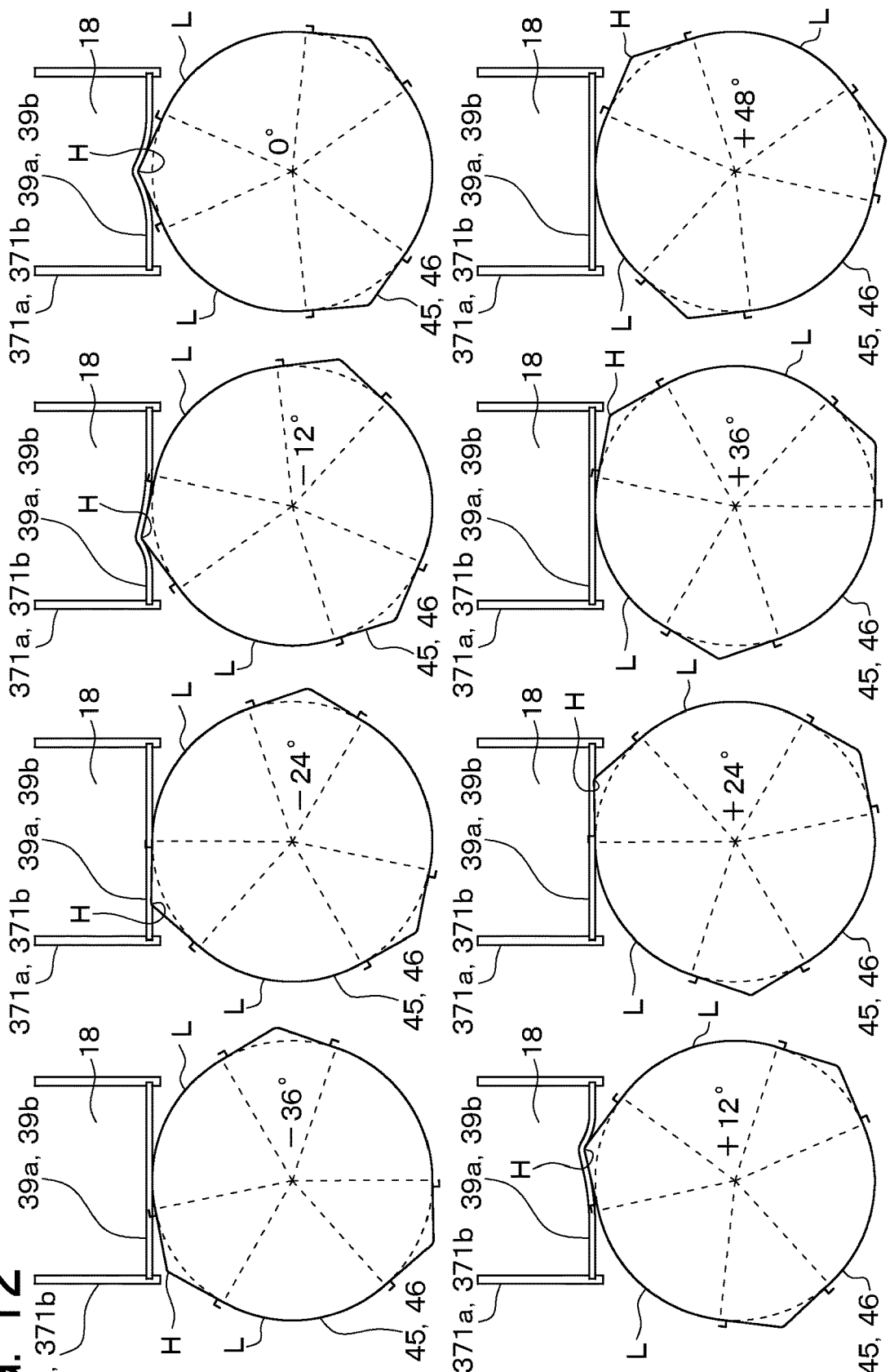
FIG. 12 is an explanatory view of the rotation of the cam and the deformation state of an elastic membrane in the continuous bubble removal apparatus according to the fifth embodiment.

Also, because the cams 45 and 46 have this kind of outer circumferential surface shape, the cams 45 and 46 are able to constantly maintain contact with the lower surfaces of the elastic membranes 39a and 39b. More specifically, just as shown in FIG. 12, the cams 45 and 46 maintain contact with the lower surfaces of the elastic membranes 39a and 39b throughout the entire process, from the state in which the lowest displacement portion L is in contact with the lower surfaces of the elastic membranes 39a and 39b (in which the rotation angle of the cams 45 and 46 is −36°), through when the highest displacement portions H of the cams 45 and 46 contact the lower surfaces of the elastic membranes 39a and 39b (in which the rotation angle of the cams 45 and 46 is −24°) and then the highest displacement portion H of the cams 45 and 46 displaces the lower surfaces of the elastic membranes 39a and 39b upward, to the state in which the lowest displacement portion L again comes into contact with the lower surfaces of the elastic membranes 39a and 39b (in which the rotation angle of the cams 45 and 46 is +48°). Therefore, the ability of the elastic membranes 39a and 39b to follow the cams 45 and 46 is good.

Figure 13:
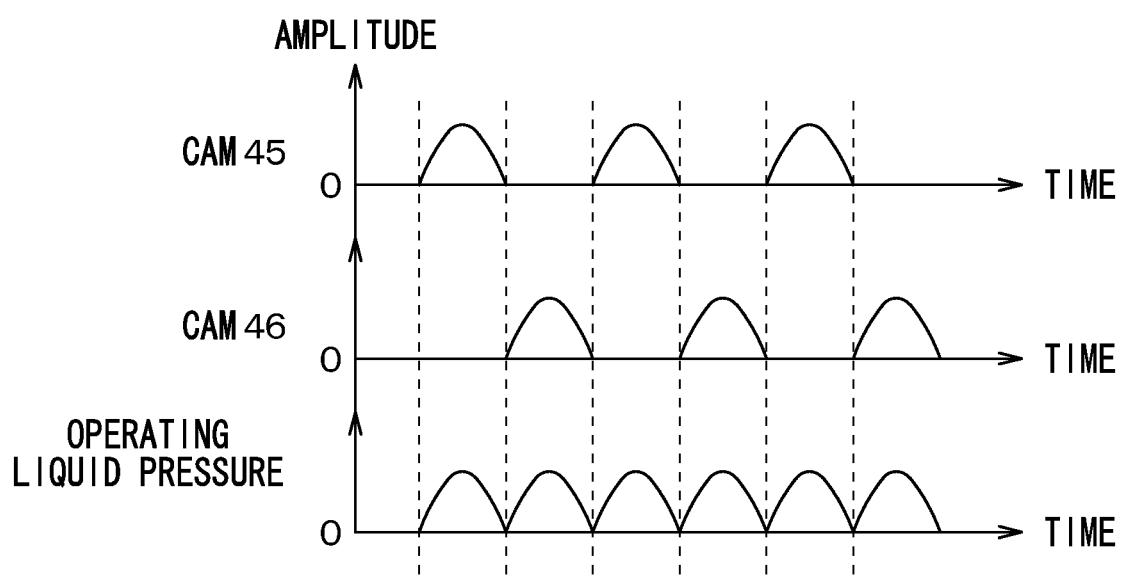
FIG. 13 is a view showing the change over time in the oscillation of two cams and the pressure applied to an operating liquid.

Also, by operating the motor 44, the cams 45 and 46 alternately displace the elastic membranes 39a and 39b by pushing the elastic membranes 39a and 39b in. Also, the elastic membranes 39a and 39b return by their own elastic force following the rotation of the cams 45 and 46. Therefore, as shown in FIG. 13, force is able to be cyclically applied to the operating liquid 18 in the large diameter section 371. As shown in FIG. 13, the application of force by each of the cams 45 and 46 is intermittent, but the change in the force that is received by the operating liquid 18 is a combination of these forces. That is, oscillation is performed continuously. The oscillation frequency when the rotation speed of the output shaft 44a is 3000 rpm is 300 Hz.

This amplification of the displacement of the elastic membranes 39a and 39b of the large diameter section 371 and the exertion of this amplified displacement on the elastic membrane 41 of the small diameter section 372 is just as described in the first to the fourth embodiments.

In this way, in the present embodiment, the timing at which the cam 45 urges the elastic membrane 39a to the operating liquid 18 side is off from the timing at which the cam 46 urges the elastic membrane 39b to the operating liquid 18 side.

Therefore, the frequency of the pressurization and depressurization to the target liquid (i.e., the frequency) is able to be increased while reducing the number of noses on a single cam. Also, because the number of noses on a single cam can be small, the load on each of the cams 45 and 46 can be reduced.

Note that in the present embodiment, the pressurization container 37 corresponds to a basic pressurization container, the elastic membrane 39a corresponds to a basic movable portion, and the elastic membrane 39b corresponds to an additional movable portion. Also, the open end portion 371a on the lower side of the large diameter section 371 corresponds to a basic supporting portion, and the open end portion 371b corresponds to an additional supporting portion. Also, the open end portion 372a on the upper side of the small diameter section 372 corresponds to a basic connecting portion. Also, the operating liquid 18 corresponds to a basic operating liquid. Also, the cam 45 corresponds to a basic cam, and the cam 46 corresponds to an additional cam.

Other Embodiments

Note that the present invention is not limited to the embodiments described above and can be modified as appropriate within the scope of the claims. Also, the embodiments described above are not independent of each other, and can be combined, as appropriate, with the exception of combinations that are clearly impossible. Further, in each of the embodiments described above, elements constituting the embodiment are not necessarily essential except in cases such as when it is clearly indicated that the elements are essential, and when the elements are considered to be obviously essential in principle. Also, in each of the embodiments described above, when numerical values such as the number, numerical value, quantity, and range, and the like of constituent elements of the embodiment are mentioned, the numerical values are not limited to the specified numerical values except in cases such as when it is particularly stated that a numerical value is essential, and when a numerical value is clearly limited in principle to a specified number. In particular, when a plurality of values are given as examples for a certain quantity, it is also possible to adopt a value between the plurality of values, unless otherwise stated or it is clearly impossible in principle. Also, in each of the embodiments described above, when the shape and positional relationship and the like of a constituent element or the like are referred to, the shape and positional relationship and the like are not limited to that shape and positional relationship except when otherwise specified and in cases such as when the shape and positional relationship and the like are limited to a specified shape and positional relationship and the like in principle. Also, in the present invention, modified examples such as those below with respect to each of the embodiments described above are also allowed. Note that the modified examples below can each be individually selectively applied or not applied to the embodiments described above. That is, any arbitrary combination of the modified examples below can be applied to the embodiments described above.

(Modified Examples of the Oscillator and the Like)

Figure 14:
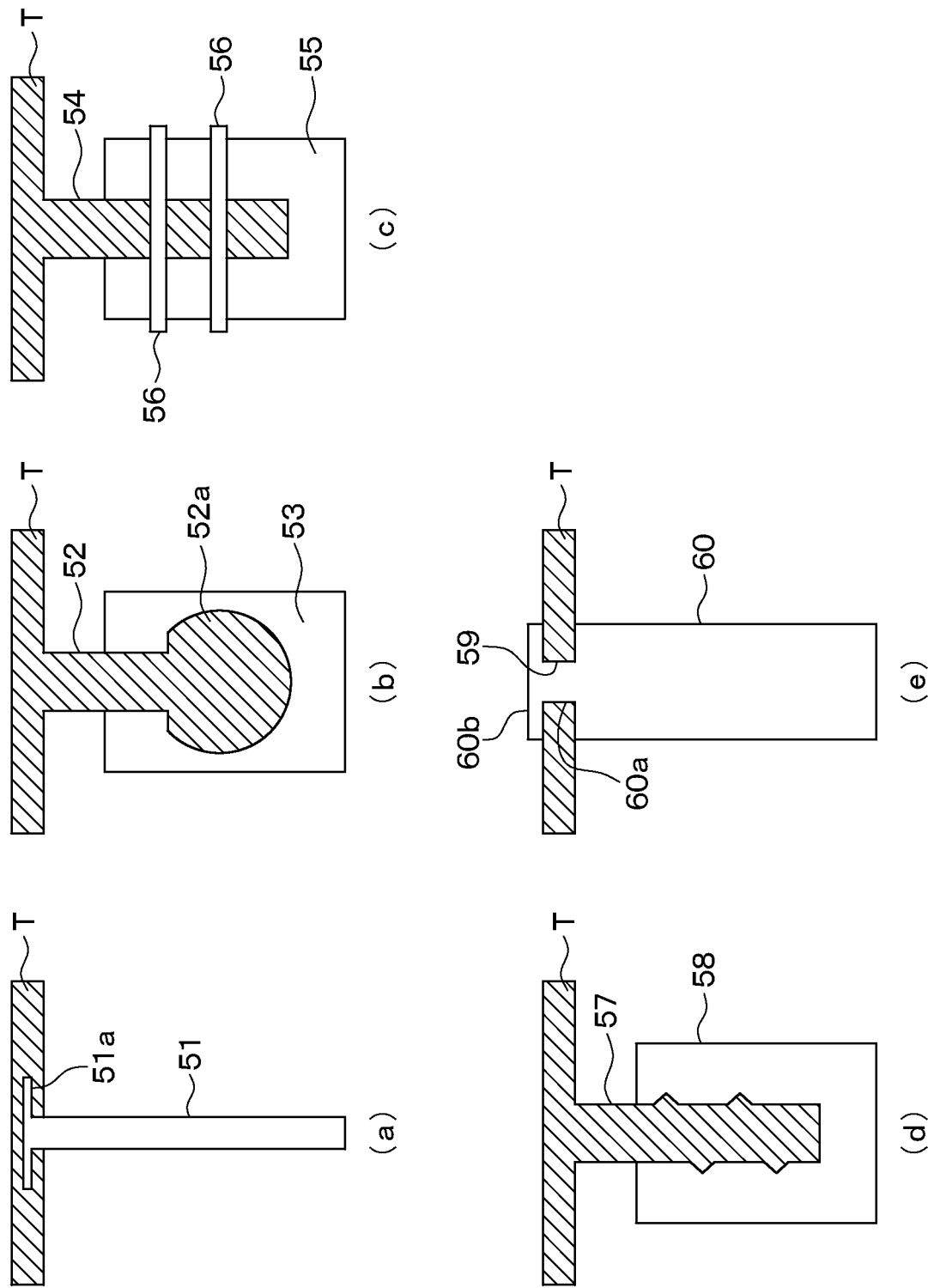
FIG. 14 is an explanatory view of a modified example of an oscillator.
Figure 15:
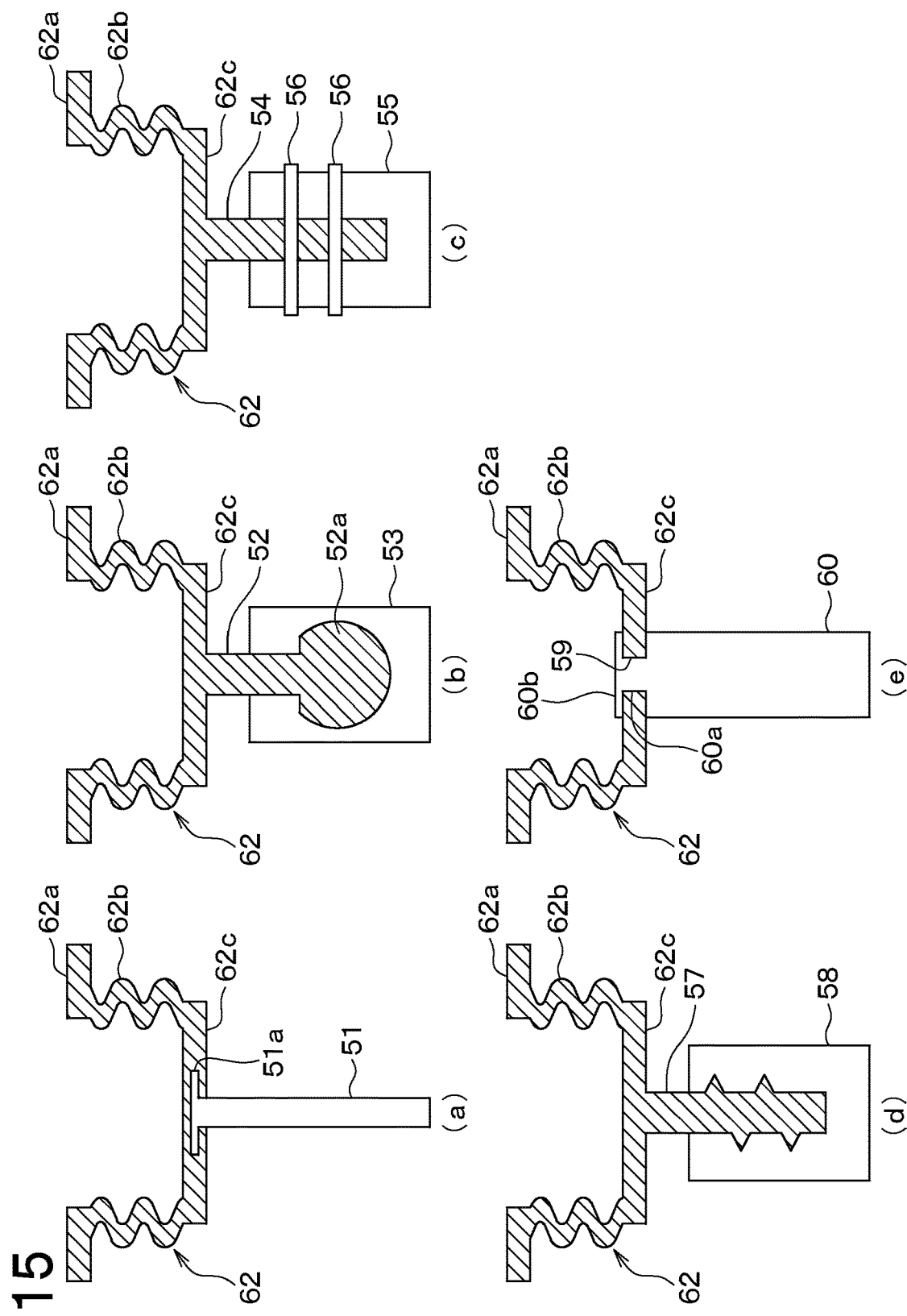
FIG. 15 is an explanatory view of a modified view in which a piston C in FIG. 14 has been changed to a bellows 62.

Various modified examples of the pistons C and CA and the oscillator 22 illustrated in the first to the fourth embodiments are possible, so several are shown in FIG. 14 and FIG. 15.

In the example shown in FIG. 14(a), the oscillator is an oscillator 51 that is made of metal or hard resin or the like, has a rod shape, and has a disc section 51a on a tip end. An elastic membrane T that is made of rubber or resin or the like and the oscillator 51 are connected by embedding this disc section 51a in the elastic membrane T.

In the example shown in FIG. 14(b), a connecting section 52 that is integrally formed with an elastic membrane T that is made of rubber or resin or the like is connected to the lower surface of the elastic membrane T. Also, the elastic membrane T and an oscillator 53 that is made of metal or hard resin or the like are connected by a sphere-shaped section 52a of the connecting section 52 being embedded in the oscillator 53.

In the example shown in FIG. 14(c), a rod-shaped connecting section 54 that is integrally formed with an elastic membrane T made of rubber or resin or the like is connected to the lower surface of the elastic membrane T. Also, a lower end of the connecting section 54 is embedded in an oscillator 55 made of metal or hard resin or the like. Further, a screw or an O-ring 56 is assembled to one or both of the connecting section 54 and the oscillator 55 so that the connecting section 54 will not come out of the oscillator 55.

In the example shown in FIG. 14(d), a connecting section 57 having a rod shape and a screw thread is connected to a lower surface of an elastic membrane T made of rubber, resin, metal, or composite material (such as glass fiber+resin or carbon fiber+resin), or the like. The connecting section 57 is integrally formed with the elastic membrane T. An internal thread is formed on an oscillator 58 that is made of metal or hard resin or the like. The elastic membrane T and the oscillator 58 are connected by screwing the connecting section 57 and the oscillator 58 together.

In the example shown in FIG. 14(e), a through-hole 59 is provided in the center portion of an elastic membrane T made of rubber or resin or the like, and a neck section 60a that aligns with the through-hole 59, and a retaining disc 60b, are provided on an oscillator 60 made of metal or hard resin or the like. The elastic membrane T and the oscillator 60 are connected by engaging the neck section 60a with the through-hole 59.

The elastic membranes T shown in FIG. 14 replace the pistons C and CA in the first to the fourth embodiments. In this case, the outer peripheral edge portions of these elastic membranes T are fixed to the open end portion of the lower end of the large diameter section that supported the pistons C and CA. Even with configurations such as those of each of these examples, the elastic membrane T can be driven by the rise and fall of the oscillator, so the same operation and effects as those of the pressurization containers illustrated in the first to the fourth embodiments can be obtained.

The examples shown in FIGS. 15(a) to (e) are examples in which a bellows 62 that has an outer peripheral ring section 62a, a body section 62b, and a disc section 62c, is used instead of the piston C. The outer peripheral ring section 62a, the body section 62b, and the disc section 62c may be integrally formed with the same material (e.g., rubber or resin), or may be formed by assembling members of different materials. The bellows 62 corresponds to the elastic membrane T in FIG. 14.

The body section 62b has a bellows shape, and thus deforms by expanding and contracting more easily than the outer peripheral ring section 62a and the disc section 62c. An accordion shape is a shape in which a plurality of convex portions in convex shapes on the outer peripheral side and a plurality of concave portions in convex shapes on the inner peripheral side are alternately arranged one by one in the extending direction of the body section 62b.

The outer peripheral ring section 62a is fixed to a lower side open end of a large diameter section. An upper side open end of the body section 62b is fixed to an inner peripheral edge portion of the outer peripheral ring section 62a. A lower side open end of the body section 62b is fixed to an outer peripheral edge portion of the disc section 62c. The disc section 62c is a membrane that has a disc shape and will not easily deform. The disc section 62c is connected to an oscillator just as in each of the examples in FIG. 14.

In each example shown in FIG. 15, the rise and fall of the oscillator causes the body section 62b to expand and contract. The expansion and contraction deformation of the body section 62b acts on the operating liquid 18 in the bellows 62, so the same operation and effects as those of the pressurization containers illustrated in the first to the fourth embodiments can be obtained. Note that the disc section 62c may be a thin membrane that easily deforms.

In this way, with the examples in FIG. 14 and FIG. 15, the oscillator is connected to the elastic membrane T and the bellows 62. Therefore, the elastic membrane T and the bellows 62 follow the oscillator with even higher responsiveness when the oscillator both rises and falls. Therefore, when the oscillator is connected to the elastic membrane T and the bellows 62, the behavior of the elastic membrane T and the bellows 62 can be more finely controlled than when the oscillator is not connected to the elastic membrane T and the bellows 62. For example, by controlling the rotation of the cam, it also becomes easier to change the amount of displacement of the elastic membrane T over time in a triangular wave rather than changing the amount of displacement of the elastic membrane T over time in a sine curve.

(Bulge Prevention Mechanism)

A flexible structural portion such as the elastic membranes 39a and 39b illustrated in the fifth embodiment or the bellows 62 shown in FIG. 15 may bulge as a result of the pressure when the pressure of the operating liquid 18 increases. Examples of countermeasures against this are shown in FIG. 16 and FIG. 17.

Figure 16:
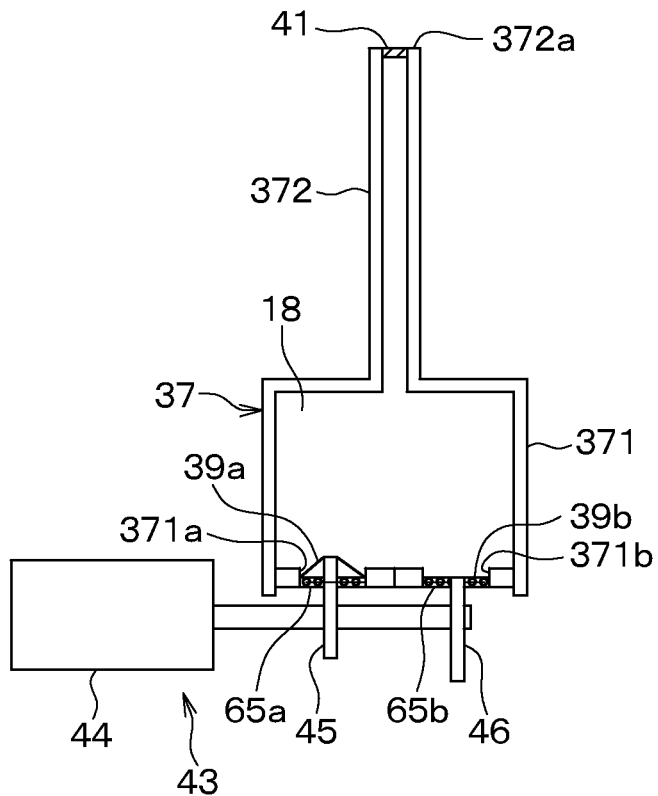
FIG. 16 is an explanatory view of a bulge prevention mechanism.
Figure 17:
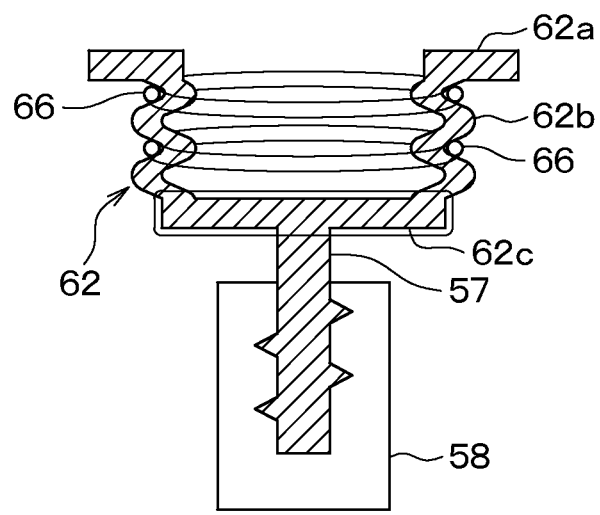
FIG. 17 is an explanatory view of a bulge prevention mechanism.

FIG. 16 shows an example in which bulge preventing members 65a and 65b made of hard resin or the like are attached to the lower sides of the elastic membranes 39a and 39b, respectively, illustrated in the fifth embodiment. In this example, the bulge preventing members 65a and 65b have flat plate shapes with holes open in the center portion. Also, outer peripheral edge portions of the bulge preventing members 65a and 65b are fixed to the open end portions 371a and 371b, respectively. Also, the holes in the center portions of the bulge preventing members 65a and 65b allow the cams 45 and 46, respectively, to pass through.

At a given timing, the elastic membrane 39a is pressed by the cam 45 and pushed in toward the operating liquid 18 side, while the elastic membrane 39b is in a state in which the force from the cam 46 is relaxed. In such a state, the elastic membrane 39b is abutted against, and thus supported by, the bulge preventing member 65b, such that the elastic membrane 39b is prevented from bulging out downward beyond the bulge preventing member 65b. Therefore, the likelihood that the pushing force from the cam 45 will end up being cancelled out by the bulging of the elastic membrane 39b is reduced.

Also, at a different timing, the elastic membrane 39b is pressed by the cam 46 and pushed in toward the operating liquid 18 side, while the elastic membrane 39a is in a state in which the force from the cam 46 is relaxed. In such a state, the elastic membrane 39a is supported abutted against the bulge preventing member 65a, such that the elastic membrane 39a is prevented from bulging out downward beyond the bulge preventing member 65a. Therefore, the likelihood that the pushing force from the cam 46 will end up being cancelled out by the bulging of the elastic membrane 39a is reduced.

FIG. 17 shows bulge preventing rings 66 fitted to an outer periphery of a plurality of concave portions of the body section 62b of the bellows 62 shown in FIG. 15. These kinds of rings 66 prevent the concave portions from bulging toward the outer peripheral side due to the pressure of the operating liquid 18. If the concave portions can be prevented from bulging toward the outer peripheral side, the oscillation of the oscillator can be more reliably transmitted to the operating liquid 18.

Other Modified Examples

In the second to the fourth embodiments, the number of sets of branch flow paths and small diameter sections is not limited to two and may be three or more depending on the length of the main flow path 3a, for example.

The drive source of the drive mechanism is not limited to a combination of a motor and a cam. Various oscillation generators such as a variety of vibrators (electric and air driven) or a speaker system can be used depending on the required amplitude, frequency, and excitation force.

Figure 18:
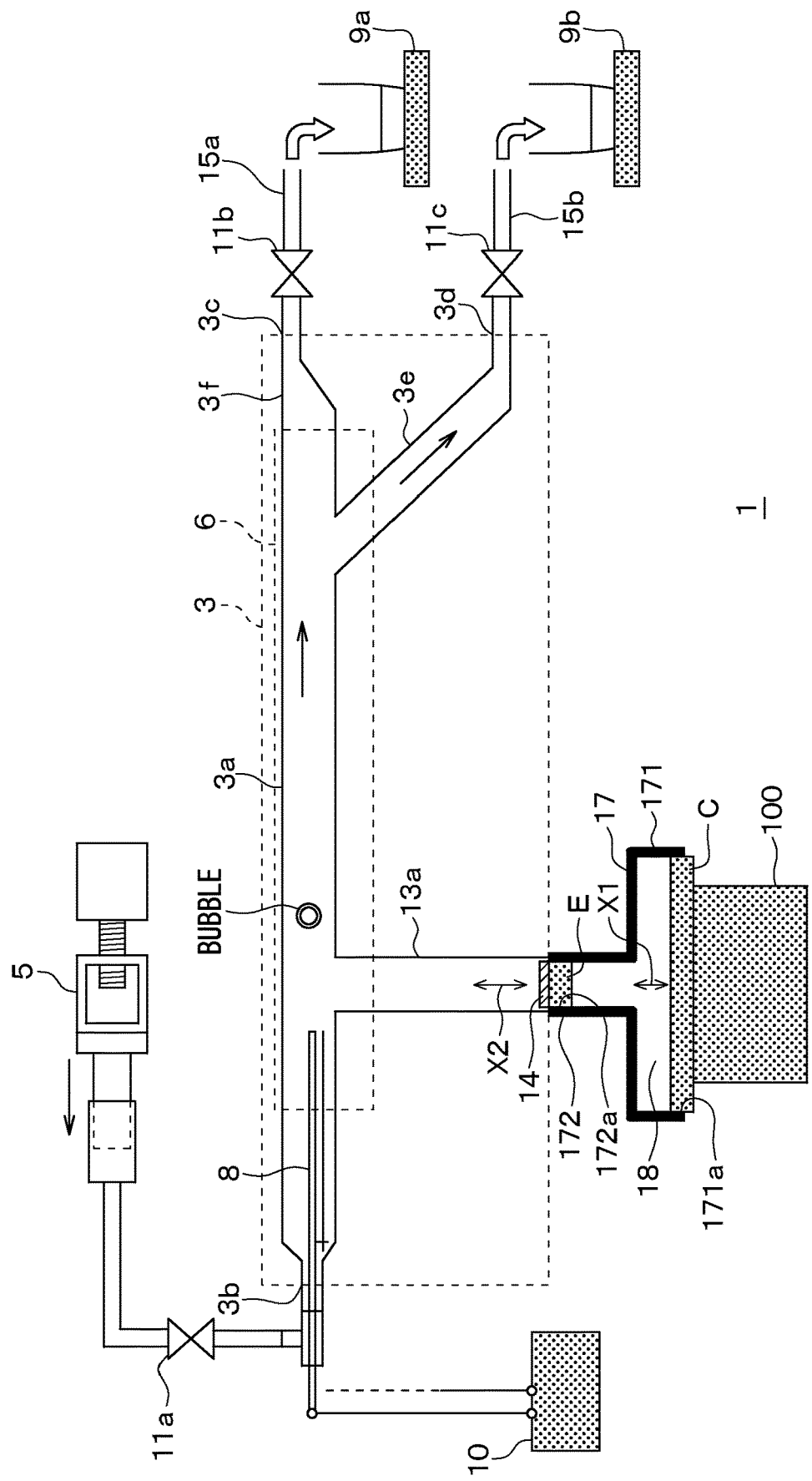
FIG. 18 is a view showing a frame format of the overall configuration of a continuous bubble removal apparatus according to another embodiment.

More specifically, the drive mechanism 19 that is a cam type oscillation generator in the first embodiment described above may be replaced with a drive mechanism 100, as shown in FIG. 18. The drive mechanism 100 is an oscillation generating source. The drive mechanism 19 applies oscillation to the piston C by contacting the piston C and oscillating. The piston C to which this oscillation is applied is displaced up and down just as in the first embodiment.

The drive mechanism 100 may be the oscillation generator mechanism described in PTL 3. This oscillation generator mechanism has a holding container and a variable oscillating force generator. The holding container is directly or indirectly connected to the piston C. The variable oscillating force generator is a circular motion generator.

The variable oscillating force generator includes a first shaft, a second shaft, an internally threaded cylinder, a first eccentric weight, a second eccentric weight, rotating means, and advancing and retreating means that is connected to the second shaft.

The first shaft is rotatably supported by the holding container. The second shaft is slidably connected to the first shaft coaxially with the first shaft, and synchronously rotates with the first shaft. The internally threaded cylinder is screwed together with a threaded portion provided around the second shaft, and is rotatably supported by the holding container, and is prevented from moving in the axial direction. The first eccentric weight is a fan-shaped weight that is fixed to the first shaft, and the second eccentric weight is a fan-shaped weight that is fixed to the internally threaded cylinder of the second shaft. The rotating means is connected to the first shaft, and the advancing and retreating means is connected to the second shaft.

When the first shaft rotates by the rotating means, the second shaft, the internally threaded shaft, the first eccentric weight, and the second eccentric weight rotate in synchronization with the first shaft. Oscillation is generated by this rotation, and this oscillation is transmitted to the piston C via the holding container, and as a result, the piston C is displaced up and down.

The amplitude of the oscillation generated by the rotation of the first eccentric weight and the second eccentric weight is determined according to the phase difference between the first eccentric weight and the second eccentric weight. The phase difference is the phase difference between the first eccentric weight and the second eccentric weight in the rotational direction of the first shaft and the second shaft.

Also, when linear motion in the axial direction of the second shaft is generated by the advancing and retreating means, this linear motion is converted into rotary motion of the internally threaded cylinder that is screwed to the threaded portion. As a result, the second eccentric weight of the internally threaded cylinder rotates and the phase difference between the second eccentric weight and the first eccentric weight is arbitrarily converted. When this phase difference changes, the amplitude of the oscillation generated in the variable oscillating force generator changes. As a result, the amplitude of the up and down displacement of the piston C changes.

The amplitude of the up and down displacement of the piston C for maintaining good bubble removal performance of the continuous bubble removal apparatus 1 varies depending on what target liquid being a target of degassing is used. When the cam type drive mechanism 19 of the first embodiment is used, the continuous bubble removal apparatus 1 must be temporarily stopped and the cam 21 must be changed in order to change the amplitude. As a result, it is necessary to prepare the same number of cams 21 as the amplitude number required for the type of the target liquid. In contrast, when the drive mechanism 100 described above is used, the amplitude can be changed to an arbitrary number by generating linear motion in the axial direction of the second shaft with the advancing and retreating means while the continuous bubble removal apparatus 1 is operating. Therefore, the optimum amplitude can be set without preparing multiple drive mechanisms 100.

Also, the drive mechanism 100 may be an oscillation generating source other than the oscillation generator mechanism described in PTL 3. For example, the drive mechanism 100 may be an oscillation generating source that includes a compressed air driven vibrator.

A volatile and flammable solvent is sometimes used as the target liquid. At this time, the continuous bubble removal apparatus 1 must be explosion-proof. The compressed air driven vibrator makes it possible to provide an explosion-proof measure that is less expensive than an electric oscillation generator.

Also, the drive mechanism 100 described above may be used as a substitute for each of the drive mechanism 19 of not only the first embodiment but also the second embodiment, the drive mechanisms 19 and 19A of the third embodiment, and the drive mechanism 19B of the fourth embodiment.

In the embodiments described above, the feed pressure of the high-pressure micro feeder 5 is approximately 0.4 to 5 atmospheres but may be a feed pressure lower than this or higher than this. The preferred feed pressure is related to the size of the bubbles and the capacity of the excitation converter. That is, large bubbles shrink easily, so a large bubble removal effect can be obtained even if the feed pressure of the high-pressure micro feeder 5 is low. Also, if the drive mechanism is a mechanical mechanism using a cam, the ability to generate oscillation is enhanced, so bubbles can be grown and shrunk even when the feed pressure of the high-pressure micro feeder 5 is high, and thus a bubble removal effect can be obtained.

The sample liquid (highly viscous fluid) used in the description of each embodiment is a 0.800 wt % sodium polyacrylate aqueous solution. However, the sample liquid may be any type of liquid as long as it is liquid in which the viscosity of the solution decreases due to shearing.

Note that the sample liquid is not limited to liquid in which the viscosity decreases due to shearing throughout the entire range of shear rates and need only be liquid in which the viscosity decreases by shearing in part of the range of the shear rates. That is, the viscosity of the sample liquid need only decrease by shearing in the range of shear rates that occur near bubbles. Therefore, a non-Newtonian fluid or a Bingham plastic fluid, or the like is preferable as a solution.

However, the bubble removal effect according to the embodiment described above can be expected even when the viscosity is close to that of a Newtonian fluid whose viscosity is less dependent on shearing. Examples of viscous fluids that can be expected to have the bubble removal effect according to the embodiments described above include paints, coating agents, polymers, pastes, and slurries.

The elastic membrane 41, the elastic membranes 14, 14A, 141, 142, and the pistons E, E1, E2, and EA of the embodiments described above are not essential components. For example, if the same kind of liquid as the target liquid that flows through the main container 3 is used in the pressurization container, the main container 3 (the branch flow path 13a and the like) and the small diameter section of the pressurization container may be directly connected. In this case, the target liquid and the operating liquid are the same type of liquid.

Also, the present invention is a continuous bubble removal method and a continuous bubble removal apparatus that removes bubbles from liquid that passes through a container, just as is illustrated in the embodiments and the like described above. However, the present invention can also be applied to a syringe (a simple sealed container) that is not designed to allow liquid to flow, as is described in Japanese Laid-Open Patent Publication No. 2007-54680, for example. That is, this syringe may be filled with liquid, and a pressurization container may be connected to one or a plurality of locations while the liquid is held in the syringe (i.e., without the liquid flowing through the syringe), and the pressure acting on the bubbles in the container may be iteratively raised and lowered by these. A similar effect is obtained in this case as well.

Also, the cam of the first to the fourth embodiments may be replaced by the cam 45 used in the fifth embodiment.

Also, the branch flow path 13b, the pressurization container 17A, the elastic membrane 14A, the piston EA, the piston CA, and the drive mechanism 19A shown in FIG. 6 may be added to the continuous bubble removal apparatus 12 shown in FIG. 5. In addition, the drive mechanisms 19 and 19A may be replaced by the drive mechanism 19B shown in FIG. 7 in a configuration with such additions.

In the continuous bubble removal apparatus 12 shown in FIG. 5, the large diameter section 291, the piston C, and the drive mechanism 19 may be replaced by the large diameter section 371, the elastic membranes 39a and 39b, and the drive mechanism 43 in FIG. 8.

Also, with each of the cams 45 and 46 illustrated in the fifth embodiment, the sizes of the angular ranges θ2, θ4, and θ6 shown in FIG. 10 may all be the same or two may be the same and the remaining one may be different, or all three may be different from each other. If the sizes of the angular ranges θ2, θ4, and θ6 do not match, the manner of displacement of the elastic membranes 39a and 39b generated by the constant velocity rotation of the cams 45 and 46 will be uneven among the angular ranges θ2, θ4, and θ6. Also, in FIG. 10, the number of high displacement portions formed on each of the cams 45 and 46 is three. However, the number of high displacement portions formed on each of the cams 45 and 46 is not limited to three, and may be one or two, or four or more.

Also, each of the pressurization containers 17, 17A, 27, and 37 of each of the embodiments described above may be modified such that the opening area is constant regardless of the position. Alternately, in each of the embodiments, the pressurization container may be eliminated, and the pistons C, CA, E, EA, E1, and E2 and the elastic membranes 39a and 39b may be directly connected to the main container 3.

REFERENCE SIGNS LIST 1, 12, 31, 33 Continuous bubble removal apparatus
3 Main container
13a, 13b Branch flow path
14, 14A, 141, 142, 39a, 39b, 41 Elastic membrane
17, 17A, 27, 37 Pressurization container
171, 291, 371 Large diameter section
172, 292, 293, 372 Small diameter section
18, 18A Operating liquid
19, 19A, 19B, 43, 100 Drive mechanism
C, CA, E, EA, E1, E2 Piston
171a, 171aA, 291a, 371a, 371b, 172a, 172aA, 292a, 293a, 372a Open end portion

The invention claimed is:

1. A continuous bubble removal method comprising:
preparing a main container, a pressurization container that connects to the main container and holds an operating liquid, and a movable portion that is displaceably attached to the pressurization container;
flowing a target liquid through the main container, the target liquid being a target of degassing, the target liquid including a bubble; and
iteratively decreasing and increasing a volume of the bubble by iteratively pressurizing and depressurizing the target liquid from a region via the operating liquid by displacing, in a reciprocating manner, the movable portion while supporting the movable portion by a supporting portion of the pressurization container, the region being surrounded by a connecting portion of the pressurization container that is closer to the main container than the supporting portion,
wherein an opening area of the supporting portion is larger than an opening area of the connecting portion.

2. A continuous bubble removal apparatus comprising:
a main container through which a target liquid flows, the target liquid being a target of degassing, the target liquid including a bubble;
a pressurization container that connects to the main container and holds an operating liquid; and
a movable portion that is displaceably attached to the pressurization container,
wherein the pressurization container includes a supporting portion and a connecting portion, the supporting portion supporting the movable portion when the movable portion is displaced in a reciprocating manner with respect to the pressurization container, and the connecting portion being disposed closer to the main container than the supporting portion and connecting to the main container,
the movable portion iteratively applies force to the operating liquid held in the pressurization container by being displaced in a reciprocating manner with respect to the pressurization container while being supported by the supporting portion, the operating liquid iteratively pressurizes and depressurizes the target liquid from a region surrounded by the connecting portion by iteratively receiving force as the movable portion is displaced in a reciprocating manner, a volume of the bubble included in the target liquid iteratively decreases and increases by the target liquid being iteratively pressurized and depressurized by the operating liquid, and an opening area of the supporting portion is larger than an opening area of the connecting portion.

3. The continuous bubble removal apparatus according to claim 2, comprising:

a main container side sealing body that is attached to an end portion on the connecting portion side of the main container and dams up the target liquid.

4. The continuous bubble removal apparatus according to claim 2, comprising:

a connecting portion side sealing body that is attached to the connecting portion and dams up the operating liquid.

5. The continuous bubble removal apparatus according to claim 2, comprising:

a cam that rotates and thereby urges the movable portion to displace the movable portion.

6. The continuous bubble removal apparatus according to claim 5, comprising:

an additional movable portion that is displaceably attached to the pressurization container; and an additional cam that urges the additional movable portion to displace the additional movable portion by rotating, wherein the pressurization container includes an additional supporting portion that supports the additional movable portion when the additional movable portion is displaced in a reciprocating manner with respect to the pressurization container, the connecting portion is closer to the main container than the additional supporting portion, the additional movable portion iteratively applies force to the operating liquid held in the pressurization container, by being displaced in a reciprocating manner with respect to the pressurization container while being supported by the additional supporting portion, the operating liquid iteratively pressurizes and depressurizes the target liquid that flows through the main container, by iteratively receiving force as the additional movable portion is displaced in a reciprocating manner, an opening area of the additional supporting portion is larger than an opening area of the connecting portion, and a timing at which the cam urges the movable portion toward the operating liquid side is offset from a timing at which the additional cam urges the additional movable portion toward the operating liquid side.

7. The continuous bubble removal apparatus according to claim 2, wherein:

the pressurization container includes an additional connecting portion that is closer to the main container than the supporting portion and connects to the main container at a location different than the connecting portion, the operating liquid iteratively pressurizes and depressurizes the target liquid, from a region surrounded by the connecting portion, and from a region surrounded by the additional connecting portion, by iteratively receiving force as the movable portion is displaced in a reciprocating manner, and an opening area of the supporting portion is larger than a sum of an opening area of the connecting portion and an opening area of the additional connecting portion.

8. The continuous bubble removal apparatus according to claim 2, comprising:

another pressurization container that holds another operating liquid and connects to the main container from a different position than the pressurization container, and another movable portion that is displaceably attached to the another pressurization container, wherein the another pressurization container includes another supporting portion that supports the another movable portion when the another movable portion is displaced in a reciprocating manner with respect to the another pressurization container, and another connecting portion that is closer to the main container than the another supporting portion and connects to the main container, the another movable portion iteratively applies force to the another operating liquid held in the another pressurization container by being displaced in a reciprocating manner with respect to the another pressurization container while being supported by the another supporting portion, the another operating liquid iteratively pressurizes and depressurizes the target liquid, from a region surrounded by the another connecting portion, by iteratively receiving force as the another movable portion is displaced in a reciprocating manner, and an opening area of the another supporting portion is larger than an opening area of the another connecting portion.

9. The continuous bubble removal apparatus according to claim 8, comprising:

a cam that urges the movable portion to displace the movable portion by rotating;

another cam that urges the other movable portion to displace the another movable portion by rotating;

an output shaft of a motor; and an extended output shaft that rotates coaxially and together with the output shaft of the motor, wherein the cam and the other cam are attached to the output shaft of the motor or the extended output shaft.

* * * * *